US009426187B2

(12) United States Patent
Hirata

(10) Patent No.: US 9,426,187 B2
(45) Date of Patent: Aug. 23, 2016

(54) DEVICE WITH TV PHONE FUNCTION, NON-TRANSITORY COMPUTER READABLE STORAGE MEDIUM, AND CONTROL METHOD OF DEVICE WITH TV PHONE FUNCTION

(71) Applicant: KYOCERA Corporation, Fushimi-ku, Kyoto (JP)

(72) Inventor: Keiichi Hirata, Nagaokakyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/699,651

(22) Filed: Apr. 29, 2015

(65) Prior Publication Data
US 2015/0237079 A1    Aug. 20, 2015

Related U.S. Application Data

(63) Continuation of application No. PCT/JP2013/079144, filed on Oct. 28, 2013.

(30) Foreign Application Priority Data

Oct. 29, 2012  (JP) .................................. 2012-237571

(51) Int. Cl.
*H04N 7/15* (2006.01)
*H04L 29/06* (2006.01)
*H04N 7/14* (2006.01)

(52) U.S. Cl.
CPC ....... *H04L 65/1086* (2013.01); *H04L 65/1059* (2013.01); *H04L 65/60* (2013.01); *H04N 7/142* (2013.01); *H04N 7/147* (2013.01)

(58) Field of Classification Search
CPC ........... H04L 65/1086; H04L 65/1059; H04L 7/142; H04L 7/147
USPC ...................................................... 348/14.07
See application file for complete search history.

(56) References Cited

U.S. PATENT DOCUMENTS

2002/0101612 A1   8/2002 Lauper et al.
2013/0278631 A1*  10/2013 Border ................. G02B 27/017
                                                345/633

FOREIGN PATENT DOCUMENTS

| JP | 2000-059772 A | 2/2000 |
| JP | 2006-140747 A | 6/2006 |
| JP | 4456791 B | 2/2010 |

OTHER PUBLICATIONS

International Search Report dated Jan. 28, 2014 issued in counterpart International Application No. PCT/JP2013/079144.
Written Opinion of the International Searching Authority issued by Japan Patent Office for International Application No. PCT/JP2013/079144.

* cited by examiner

*Primary Examiner* — Creighton Smith
(74) *Attorney, Agent, or Firm* — Procopio Cory Hargreaves and Savitch LLP

(57) ABSTRACT

A device and methods are disclosed. A call control module transmits a moving image captured by a photographing module and sound input by a sound input module to a communication partner device via a communication module, when the communication module receives a moving image from the communication partner device by the communication module, displays the received moving image in a display area set on a display surface, when the communication module receives sound from the communication partner device by the communication module, outputs the received sound from the sound output module, and outputs a transmission restraint signal for restraining transmission of a moving image to the communication partner device, when a first determination condition for use in judging that a user is not watching a moving image displayed in the display area is satisfied.

10 Claims, 18 Drawing Sheets

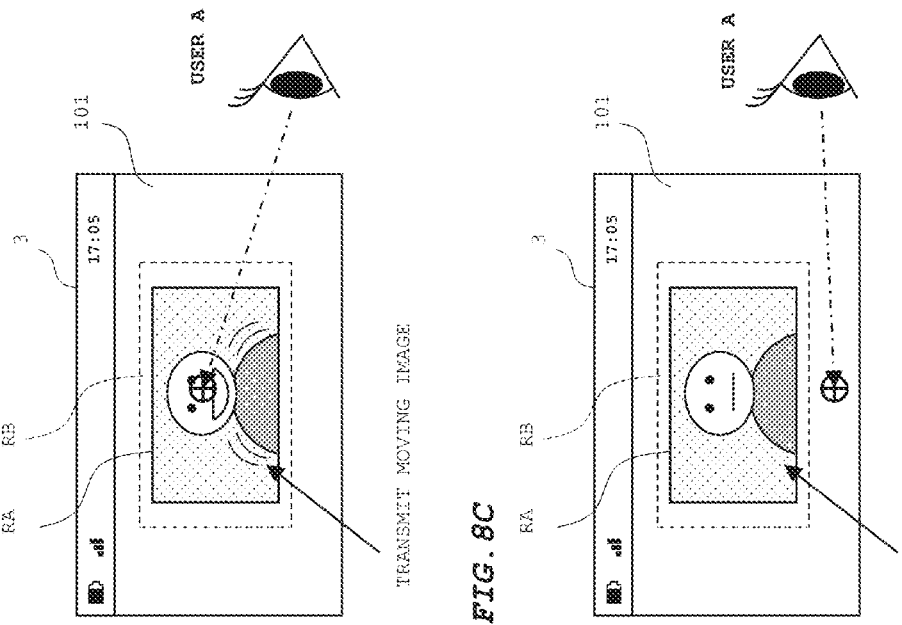
FIG. 8B
FIG. 8C
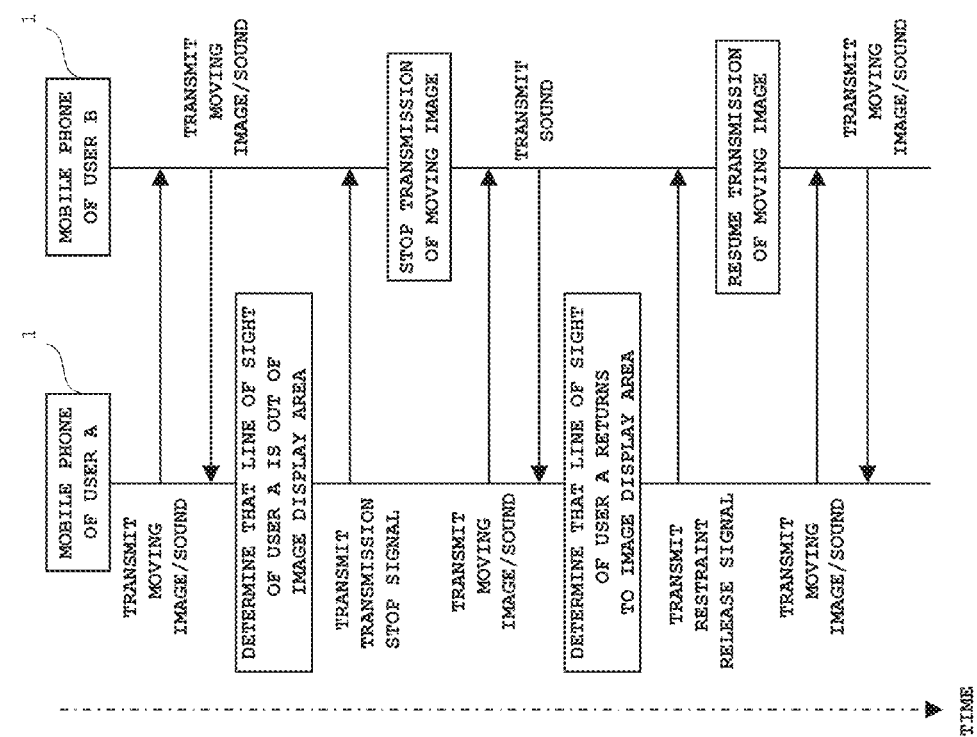
FIG. 8A

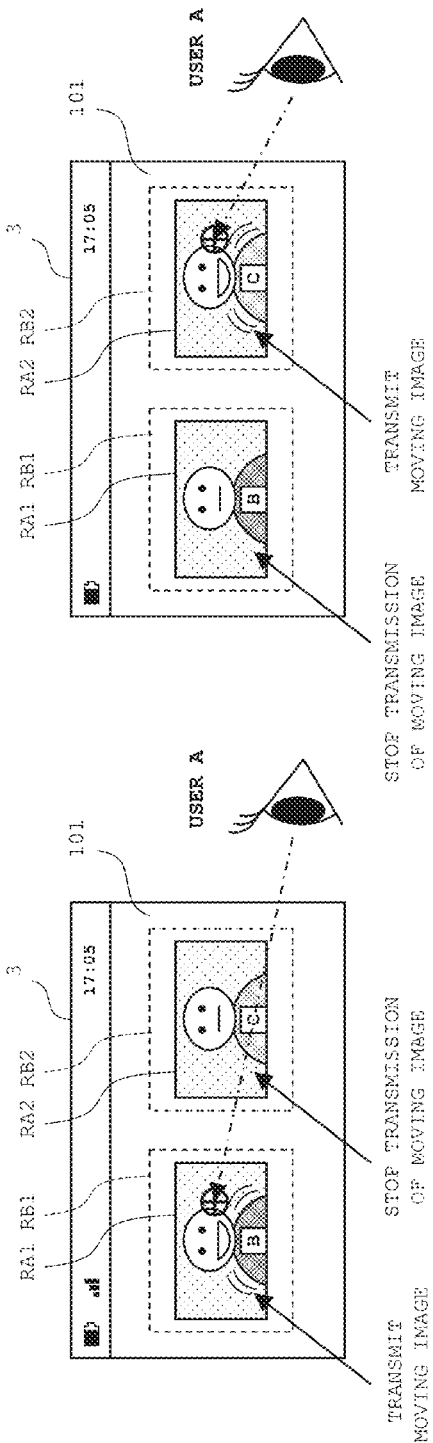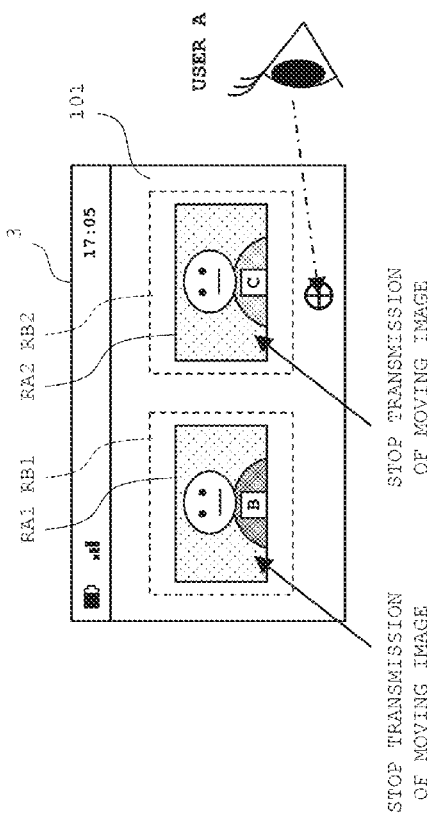

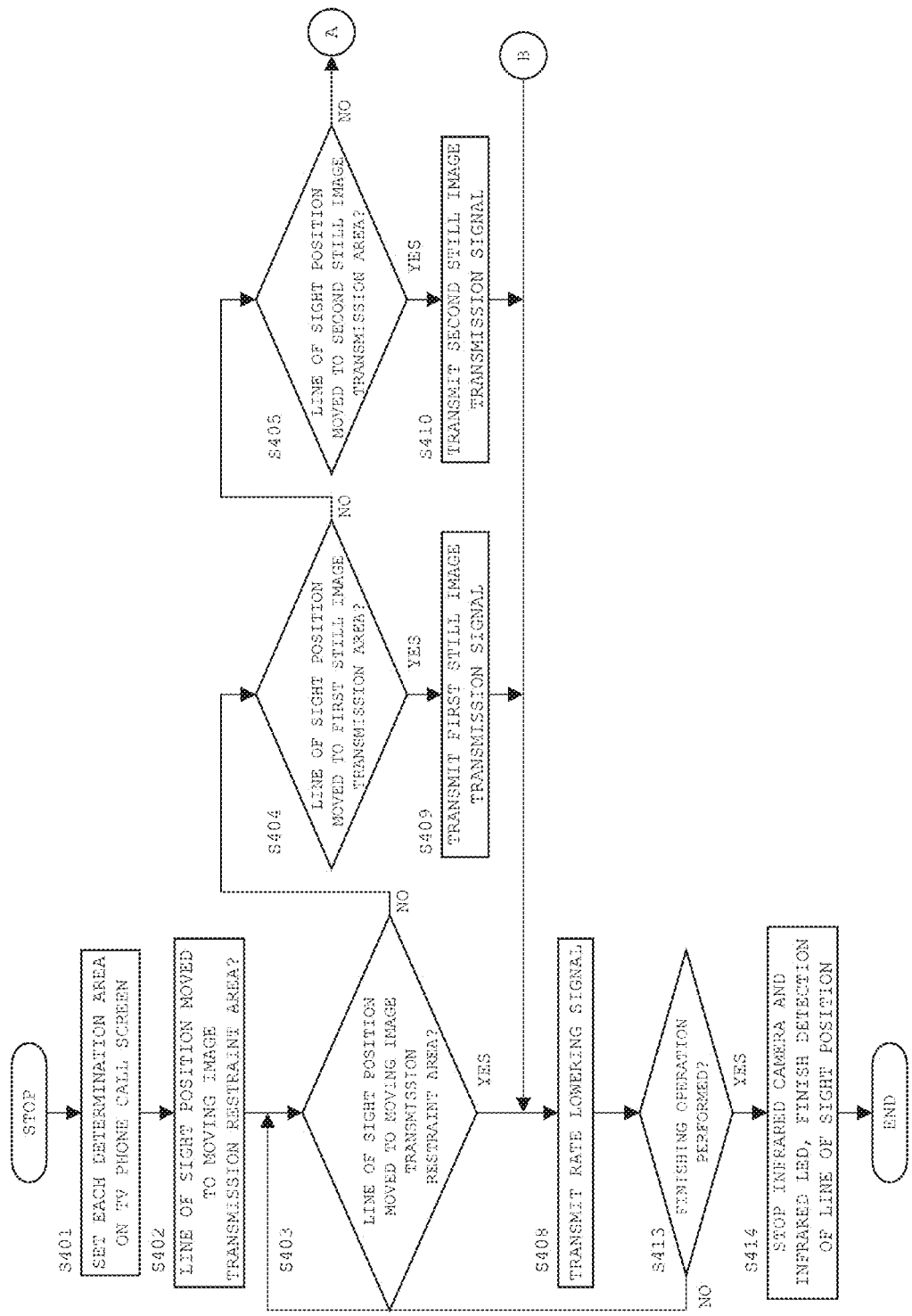

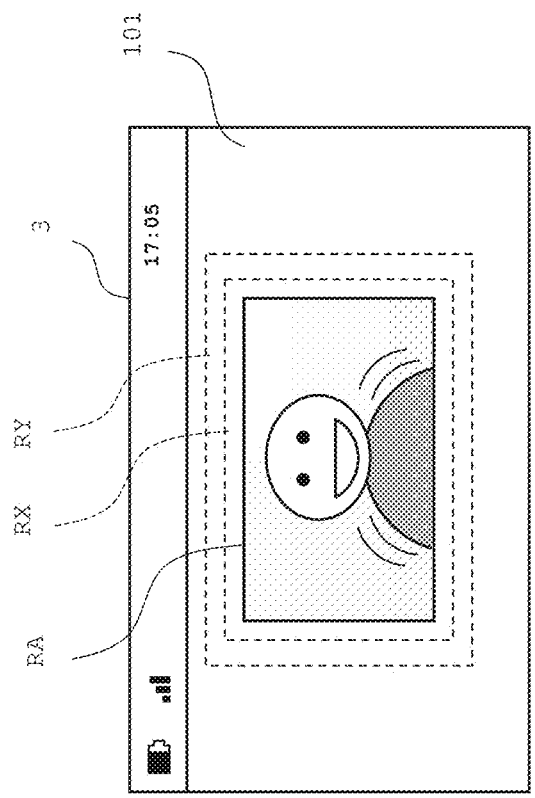

DEVICE WITH TV PHONE FUNCTION, NON-TRANSITORY COMPUTER READABLE STORAGE MEDIUM, AND CONTROL METHOD OF DEVICE WITH TV PHONE FUNCTION

This application claims priority under 35 U.S.C. Section 119 of Japanese Patent Application No. 2012-237571 filed Oct. 29, 2012, entitled "APPARATUS HAVING TELEVISION TELEPHONE FUNCTION, PROGRAM, AND CONTROL METHOD FOR APPARATUS HAVING TELEVISION TELEPHONE FUNCTION". The disclosure of the above application is incorporated herein by reference.

FIELD

Embodiments of the present disclosure relates to a device with a TV phone function such as a mobile phone, a PDA (Personal Digital Assistant), and a tablet PC provided with a TV phone function. Embodiments of the present disclosure also relates to a non-transitory computer readable storage medium suitable for use in the device with a TV phone function, and to a control method suitable for use in the device with a TV phone function.

BACKGROUND

Conventionally, there are known mobile phones provided with a TV phone function. When the TV phone function is executed, moving images (moving image data) captured by a camera are transmitted and received between mobile phones along with sound. According to this configuration, the user is allowed to talk with a communication partner while watching a moving image of the communication partner displayed on a display surface.

SUMMARY

A device and methods are disclosed. A communication module transmits and receives data. A photographing module captures an image of a subject. A sound input module receives input of sound. A sound output module outputs sound. A display module includes a display surface. A call control module transmits a moving image captured by the photographing module and sound input by the sound input module to a communication partner device via a communication module, when the communication module receives a moving image from the communication partner device by the communication module, displays the received moving image in the display area set on the display surface, when the communication module receives sound from the communication partner device by the communication module, outputs the received sound from the sound output module, and outputs a transmission restraint signal for restraining transmission of a moving image to the communication partner device, when a first determination condition for use in judging that a user is not watching a moving image displayed in the display area is satisfied.

In one embodiment, a method for controlling a device with a TV phone function is disclosed. The method transmits a photographed moving image and sound to a communication partner device. The method then, in response to receiving a moving image and sound from the communication partner device, displays received moving image in a display area, and outputting the received sound. The method then determines whether a first determination condition for use in judging that a user is not watching the moving image displayed in the display area is satisfied. The method then outputs a transmission restraint signal for restraining transmission of a moving image to the communication partner device, when it is determined that the first determination condition is satisfied.

BRIEF DESCRIPTION OF THE DRAWINGS

FIGS. 8A to 8C are diagrams of an example when the user A and the user B make a TV phone call using mobile phones in an embodiment;

FIGS. 9A to 9C are diagrams of an example when the user A makes a TV phone call simultaneously with the user B and with the user C in an embodiment;

FIG. 10 is a flowchart of a moving image data amount adjusting process in a first modification;

FIG. 18 is a diagram for describing the other modifications.

Figure 1B:
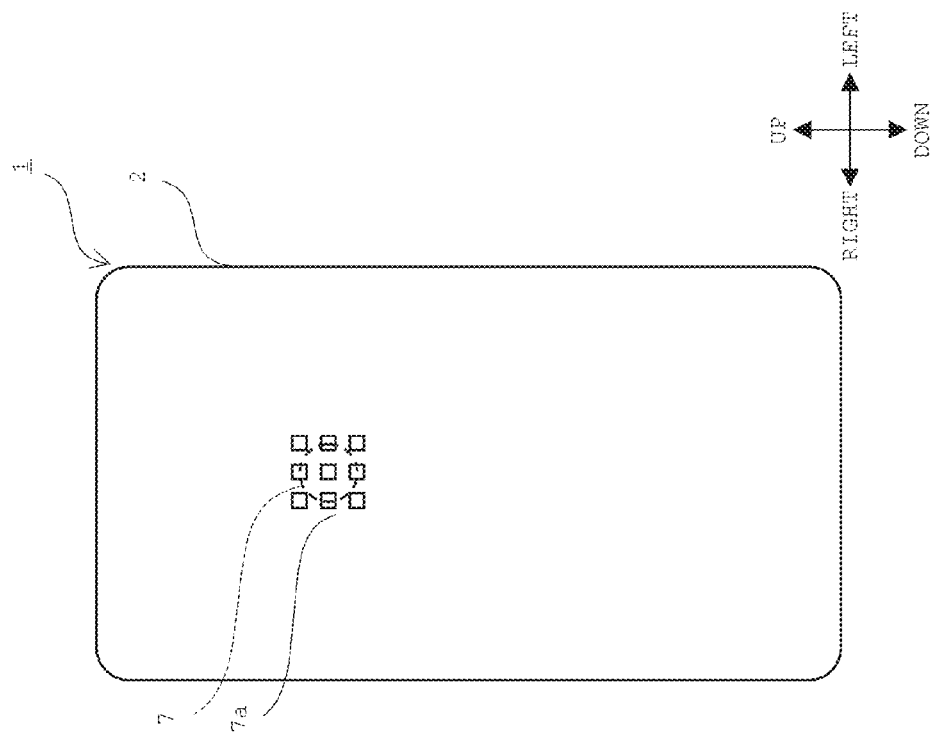
FIGS. 1A and 1B are diagrams of a configuration of a mobile phone in an embodiment.

The drawings are provided for purpose of illustration only, and do not limit the scope of the present disclosure.

DESCRIPTION OF PREFERRED EMBODIMENTS

In the following, an embodiment of the present disclosure is described referring to the drawings.

Figure 1A:
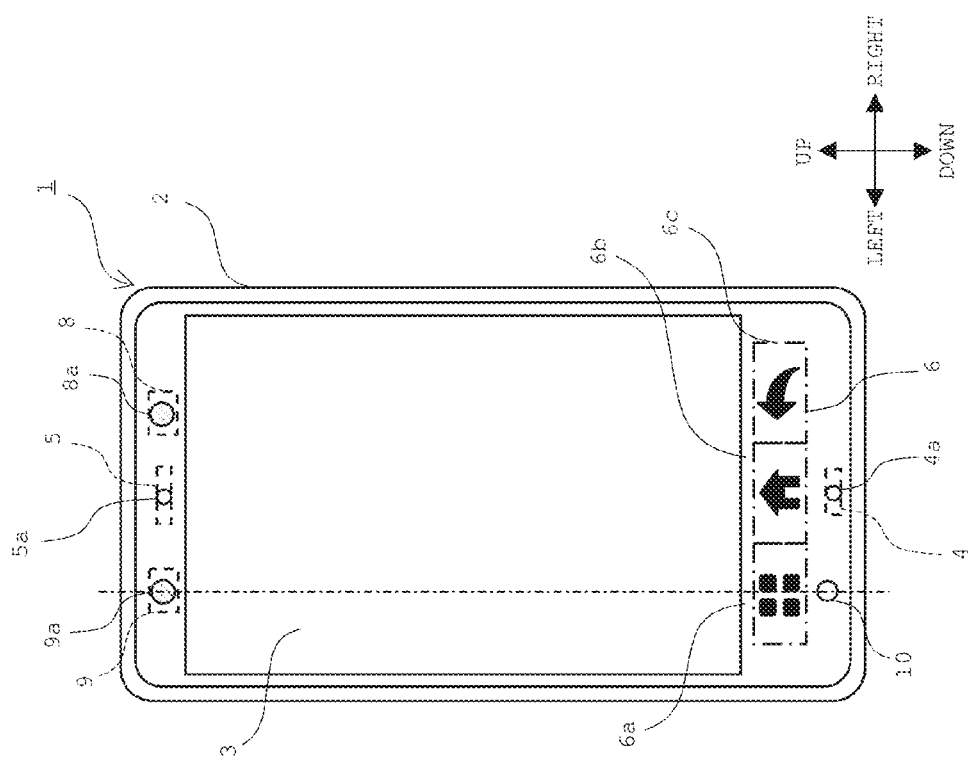

FIGS. 1A and 1B are diagrams of a configuration of a mobile phone 1. FIGS. 1A and 1B are respectively a front view and a rear view of the mobile phone 1.

In the following, to simplify the description, as illustrated in FIGS. 1A and 1B, the long side direction of a cabinet 2 is defined as up and down directions, and the short side direction of the cabinet 2 is defined as left and right directions.

The mobile phone 1 may include the cabinet 2, a display surface 3, a microphone 4, a call speaker 5, a key operation part 6, an external speaker 7, a camera 8, an infrared camera 9, and an infrared LED 10.

The cabinet 2 may have a substantially rectangular contour when viewed from the front side. The display surface 3 of a display module 13 to be described later may be disposed on the front surface of the cabinet 2. Various images (screens) are displayed on the display surface 3.

The microphone 4 may be disposed at a lower end within the cabinet 2, and the call speaker 5 may be disposed at an upper end within the cabinet 2. Sound is input through a microphone hole 4a formed in the front surface of the cabinet 2. The microphone 4 generates an electrical signal in accordance with input sound. Sound is output from the call speaker 5. The output sound is released to the outside through an output hole 5a formed in the front surface of the cabinet 2.

The key operation part 6 may be disposed on the front surface of the cabinet 2. The key operation part 6 may include a setting key 6a, a home key 6b, and a back key 6c. The setting key 6a is a key mainly configured to display setting screens for various settings on the display surface 3. The home key 6b is a key mainly configured to display a home screen on the display surface 3. The back key 6b is a key mainly configured to return an executed process to an immediately preceding process.

The external speaker 7 may be disposed in the cabinet 2. Output holes 7a associated with the external speaker 7 are formed in the back surface of the cabinet 2. Sound (such as voice or alarm) output from the external speaker 7 is released to the outside through the output holes 7a.

The camera 8 may be disposed on the right of the call speaker 5. A lens window 8a is formed in the front surface of the cabinet 2. An image of a subject is captured by the camera 8 through the lens window 8a.

The infrared camera 9 may be disposed on the left of the call speaker 5. A lens window 9a is formed in the front surface of the cabinet 2. An image of a subject is captured by the infrared camera 9 through the lens window 9a.

The infrared LED 10 for emitting infrared light may be disposed on the left of the microphone 4. The light emitting surface of the infrared LED 10 is exposed to the outside. The infrared LED 10 may be disposed at the same position as the infrared camera 9 in left and right directions of the cabinet 2.

Figure 2:
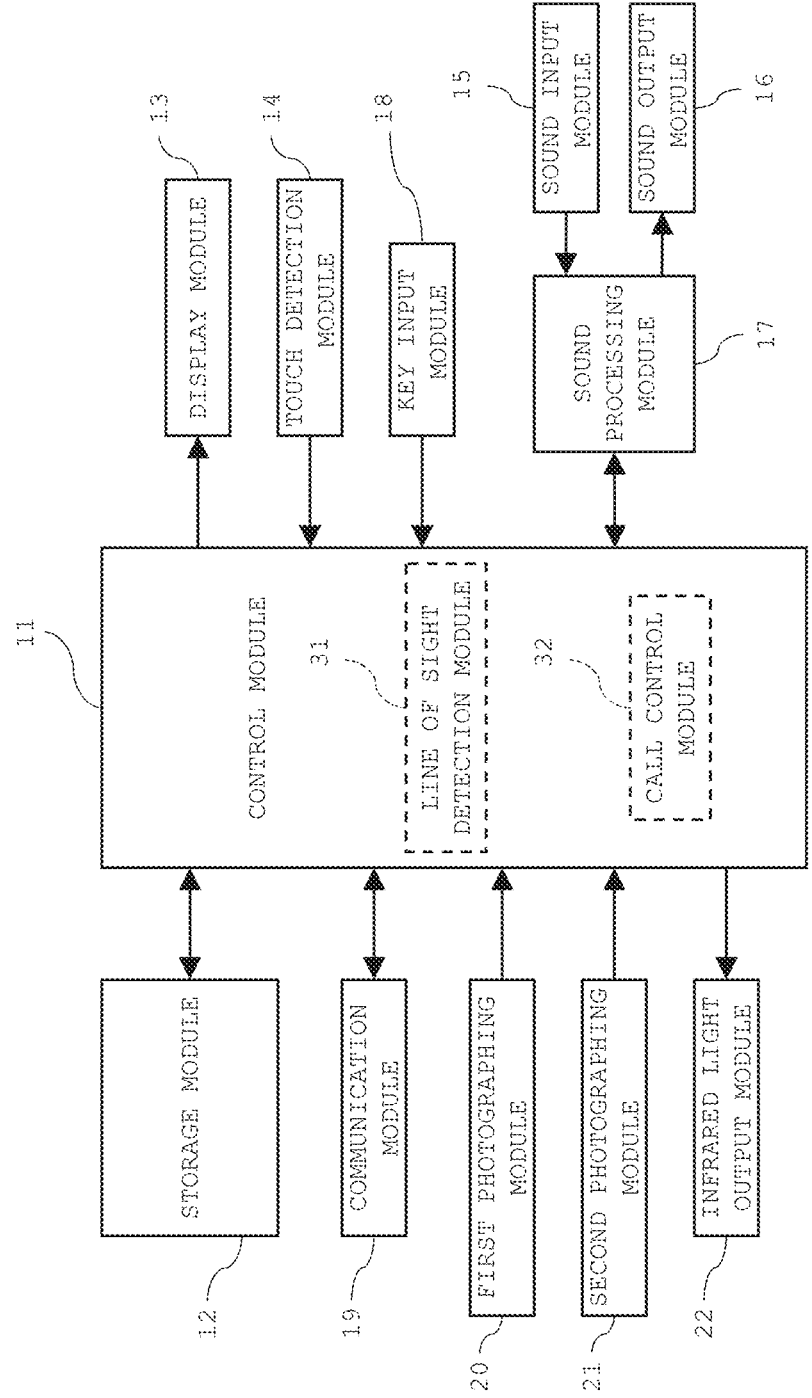
FIG. 2 is a block diagram of the overall configuration of the mobile phone in an embodiment.

FIG. 2 is a block diagram of the overall configuration of the mobile phone 1. The mobile phone 1 may include a control module 11, a storage module 12, the display module 13, a touch detection module 14, a sound input module 15, a sound output module 16, a sound processing module 17, a key input module 18, a communication module 19, a first photographing module 20, a second photographing module 21, and an infrared light output module 22.

The storage module 12 may include an ROM, an RAM, and an external memory. The storage module 12 stores therein various programs. The programs stored in the storage module 12 include, in addition to a control program for controlling the modules of the mobile phone 1, various applications (e.g. applications relating to a phone, an e-mail, an phone book, a map, a game, and a schedule management). The programs may be stored in the storage module 12 when the mobile phone 1 is manufactured by the manufacturer, or may be stored in the storage module 12 by the user via a communication network or a storage medium.

The storage module 12 may also include an unillustrated working area for storing data to be temporarily used or generated when a program is executed.

The control module 11 may include a CPU. The control module 11 controls the modules constituting the mobile phone 1 (such as the storage module 12, the display module 13, the touch detection module 14, the sound input module 15, the sound output module 16, the sound processing module 17, the key input module 18, the communication module 19, the first photographing module 20, the second photographing module 21, and the infrared light output module 22) in accordance with a program.

The display module 13 may include a liquid crystal display. The display module 13 displays an image (a screen) on the display surface 3, based on a control signal and an image signal from the control module 11. The display module 13 may include another display device such as an organic EL display, in place of a liquid crystal display.

The touch detection module 14 may include a touch panel configured to detect touch of the display surface 3 by the fingertip. The touch panel may be formed of a transparent sheet-like member, and may be disposed on the front surface of the cabinet 2 in such a manner as to cover the display surface 3. The touch panel may be any one of various types of touch panels such as an electrostatic capacitive touch panel, an ultrasonic touch panel, a pressure sensitive touch panel, a resistive touch panel, and a photosensitive touch panel.

The touch detection module 14 receives a user's touch operation onto the display surface 3. Specifically, the touch detection module 14 detects a position on the display surface 3 where the fingertip has touched as a touch position, and outputs a position signal indicating the detected touch position to the control module 11.

The user is allowed to perform various touch operations by touching the display surface 3 by the fingertip. Examples of the touch operations are a tap operation, a flick operation, and a slide operation. The tap operation is an operation of touching the display surface 3 by the fingertip, and then releasing the fingertip from the display surface 3 within a short time. The flick operation is an operation of flicking the display surface 3 in an arbitrary direction with the fingertip. The slide operation is an operation of moving the fingertip on the display surface 3 in an arbitrary direction while keeping the fingertip in contact with the display surface 3. The flick operation and the slide operation are touch operations accompanying movement of a touch position.

The touch operations are described in detail. For instance, when after a touch position with respect to the display surface 3 is detected by the touch detection module 14, the touch position cannot be detected any more within a predetermined first time, the control module 11 determines that a tap operation has been performed. When after a touch position with respect to the display surface 3 is detected by the touch detection module 14 and the touch position is moved by a predetermined first distance or more within a predetermined second time, the touch position cannot be detected any more, the control module 11 determines that a flick operation has been performed. When after a touch position with respect to the display surface 3 is detected by the touch detection module 14, the touch position is moved by a predetermined second distance or more, the control module 11 determines that a slide operation has been performed.

The sound input module 15 may include the microphone 4. The sound input module 15 outputs an electrical signal from the microphone 4 to the sound processing module 17.

The sound output module 16 may include the call speaker 5 and the external speaker 7. The sound output module 16 receives an electrical signal from the sound processing module 17, and outputs sound (such as voice or alarm) from the call speaker 5 or from the external speaker 7.

The sound processing module 17 performs e.g. ND conversion to an electrical signal from the sound input module 15, and outputs a digital sound signal which has undergone ND conversion to the control module 11. The sound processing module 17 performs e.g. a decoding process and D/A conversion to the digital sound signal output from the control module 11, and outputs an electrical signal which has undergone D/A conversion to the sound output module 16.

The key input module 18 outputs, to the control module 11, a signal associated with each one of the operation keys when the operation keys in the key operation part 6 are pressed.

The communication module 19 may include a circuit for converting a signal, and an antenna for transmitting and receiving a radio wave in order to make a phone call or to perform communication. The communication module 19 converts a signal to be input from the control module 11 for a phone call or for communication into a wireless signal, and transmits the converted wireless signal to a communication destination such as a base station or another communication device via the antenna. Further, the communication module 19 converts the wireless signal received via the antenna into a signal of a format usable by the control module 11, and outputs the converted signal to the control module 11.

The first photographing module 20 may include the camera 8. The first photographing module 20 performs various image processing with respect to image data representing an image captured by the camera 8, and outputs the image data after the image processing to the control module 11.

The second photographing module 21 may include the infrared camera 9. The second photographing module 21 performs image processing with respect to image data representing an image captured by the infrared camera 9, and outputs monochromatic image data to the control module 11.

The infrared light output module 22 may include an infrared LED 10, and an LED driving circuit. The LED driving circuit drives the infrared LED 10 in accordance with a control signal from the control module 11.

The mobile phone 1 in an embodiment is provided with a TV phone function. In order to execute the TV phone function, the control module 11 may include a line of sight detection module 31, and a call control module 32.

The line of sight detection module 31 detects a line of sight position of the user on the display surface 3, based on the movement of an eye of the user captured by the second photographing module 21 (the infrared camera 9).

FIGS. 3A to 3D are diagrams for describing detection of a line of sight position by the line of sight detection module 31. Referring to FIGS. 3A to 3D, detection of a line of sight position is described in detail.

Photographing is performed by the infrared camera 9, and infrared light is emitted from the infrared LED 10 in order to detect a line of sight position. When the user looks at the display surface 3, an image including the eye of the user and infrared light reflected on the eye (hereinafter, called as "reflected light") is captured by the infrared camera 9.

Figure 3A:
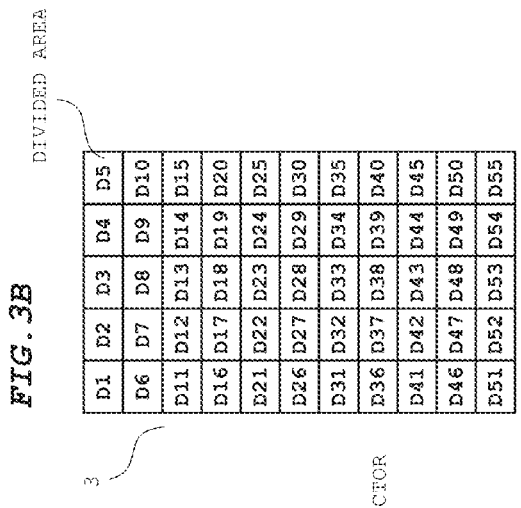
FIGS. 3A to 3D are diagrams for describing detection of a line of sight position by a line of sight detection module in an embodiment.

The line of sight detection module 31 detects the pupil and the reflected light from the image captured by the infrared camera 9. As illustrated in FIG. 3A, the line of sight detection module 31 calculates a vector directing from the center A of reflected light toward the center B of the pupil (hereinafter, called as a "line-of-sight vector"). The line-of-sight vector is calculated by using a predetermined coordinate system associated with an image captured by the infrared camera 9.

Figure 3B:
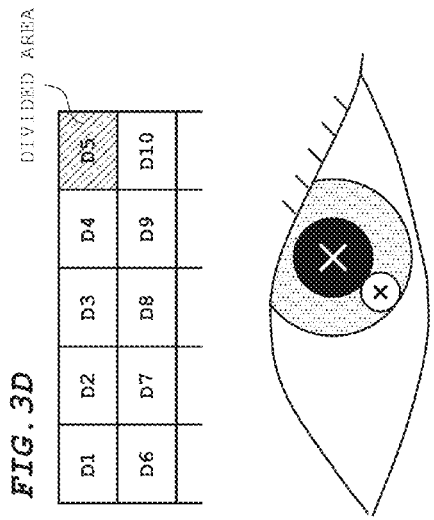

A line of sight position detecting method is described in detail. The display surface 3 is divided into a plurality of divided areas by grids. FIG. 3B illustrates a configuration example, in which the display surface 3 is divided into fifty-five divided areas arranged in eleven rows by five columns. Identification information pieces D1 to D55 are attached to the respective divided areas. Information on coordinates representing the positions and the sizes of the divided areas is stored in the storage module 12 in association with the identification information pieces. The number and the shape of the divided areas are not limited to the example illustrated in FIG. 3B, but may be optionally set.

Figure 3C:
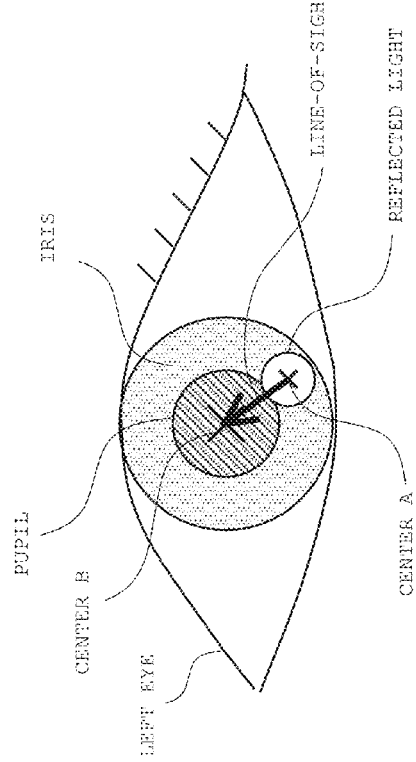
Figure 3D:
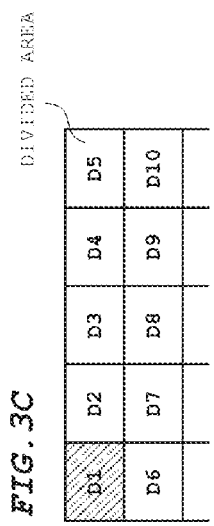

FIG. 3C is a diagram exemplifying a movement of the eye when the user gazes at the divided area D1 at the leftmost column in the uppermost row. FIG. 3D is a diagram exemplifying a movement of the eye when the user gazes at the divided area D5 at the rightmost column in the uppermost row. As illustrated in FIGS. 3C and 3D, a positional relationship between reflected light and the pupil changes, as the user's line of sight changes, and the line-of-sight vector changes accordingly.

A calibration process is performed before a line of sight position is detected. In the calibration process, for instance, by sequentially changing the colors of the divided areas to a predetermined color, the user's line of sight is guided to each of the divided areas. A line-of-sight vector to be obtained when the user gazes at each of the divided areas is calculated by the line of sight detection module 31, and is stored in the storage module 12, as a reference vector.

When a line of sight position is detected, the line of sight detection module 31 detects a reference vector which is most approximate to an actually acquired line-of-sight vector for determining that the user's line of sight position is in a divided area associated with the reference vector. Further, the line of sight detection module 31 determines that the user's line of sight position is out of the display surface 3, when there is no reference vector which is approximate to an actually acquired line-of-sight vector.

The call control module 32 controls a call relating to a TV phone function. Specifically, when a communication path for a TV phone call is established, and a call is started, the call control module 32 concurrently executes a moving image/sound receiving process, a moving image/sound transmitting process, and a moving image data amount adjusting process to be described later. These processes are executed in accordance with a control program stored in the storage module 12.

In the moving image/sound receiving process, when the communication module 19 receives a moving image and sound from a communication partner device, the call control module 32 displays the received moving image in an image display area RA set on the display surface 3, and outputs the received sound from the external speaker 7.

In the moving image/sound transmitting process, the call control module 32 transmits a moving image (moving image data) captured by the first photographing module 20 (the camera 8) and sound (sound data) input to the sound input module 15 to the communication partner device (e.g. a mobile phone) via the communication module 19. Further, in the moving image/sound transmitting process, the call control module 32 stops transmission of a moving image to the communication partner device, based on a transmission stop signal to be output from the communication partner device when the user's line of sight position is out of the image display area set on the display surface of the communication partner device; and the call control module 32 resumes transmission of a moving image to the communication partner device, based on a restraint release signal to be output from the communication partner device when the user's line of sight position returns to the image display area.

In the moving image data amount adjusting process, the call control module 32 determines whether the user's line of sight position is out of the image display area RA, based on a detection result of the line of sight detection module 31. The call control module 32 outputs a transmission restraint signal for restraining transmission of a moving image to the communication partner device, based on a detection that the line of sight position is out of the image display area RA. Further, the call control module 32 determines whether the user's line of sight position returns to the image display area RA, based on a detection result of the line of sight detection module 31. The call control module 32 outputs a restraint release signal for releasing restraint of transmission of a moving image to the communication partner device, based on a detection that the line of sight position returns to the image display area RA.

In the following, the moving image/sound receiving process, the moving image/sound transmitting process, and the moving image data amount adjusting process are described in detail.

Figure 4:
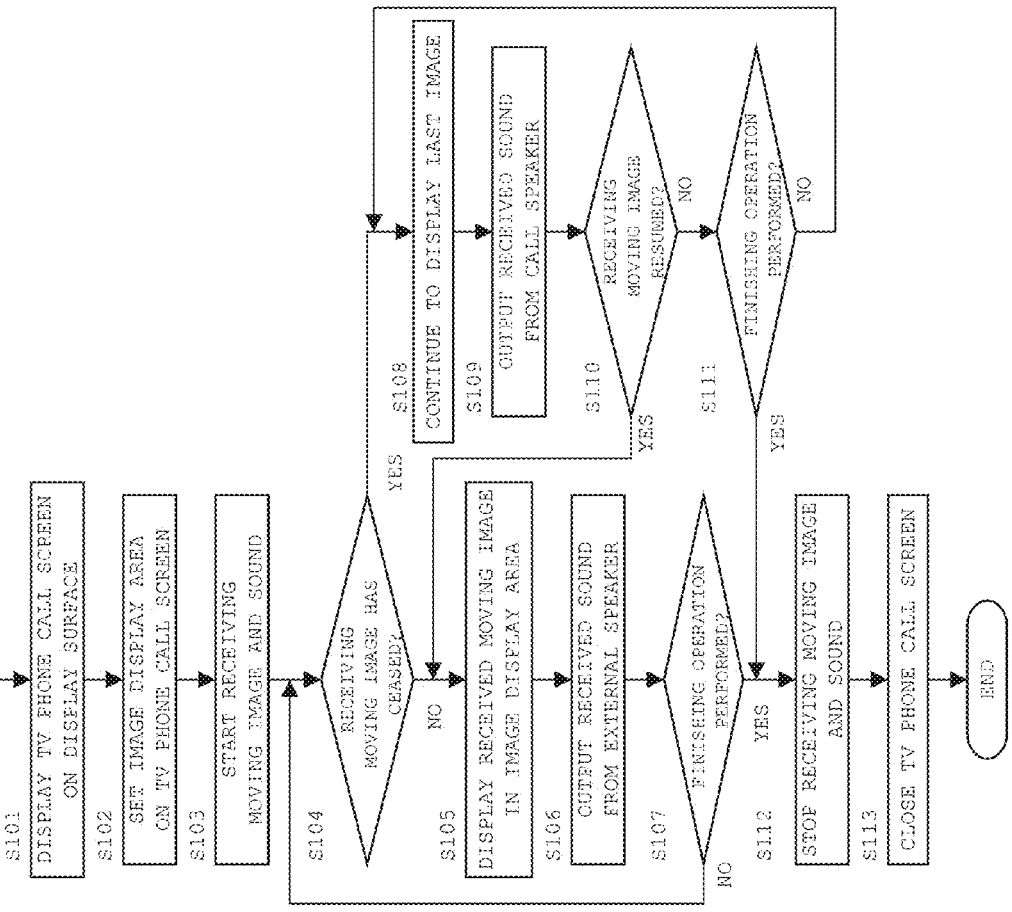
FIG. 4 is a flowchart of a moving image/sound receiving process in an embodiment.
Figure 5:
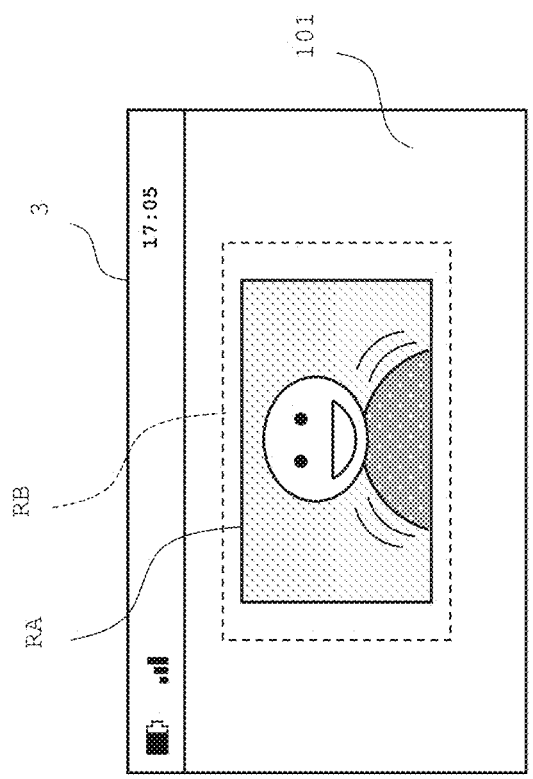
FIG. 5 is a diagram of an example of a TV phone call screen to be displayed on a display surface when a user makes a TV phone call in an embodiment.

FIG. 4 is a flowchart of the moving image/sound receiving process. FIG. 5 is a diagram of an example of a TV phone call screen 101 to be displayed on the display surface 3 when a TV phone call is made. The moving image/sound receiving process is described, referring to FIG. 4 and FIG. 5.

When the process is started, the call control module 32 displays the TV phone call screen 101 as illustrated in FIG. 5 on the display surface 3 (S101). Subsequently, the call control module 32 sets the image display area RA on the display surface 3, specifically, on the TV phone call screen 101 (S102). In an embodiment, when the TV phone function is executed, the mobile phone 1 is used in a sideways state, and the TV phone call screen 101 corresponding to the sideways state is displayed on the display surface 3. On the TV phone call screen 101, information relating to a TV phone call such as the contact information of a communication partner, and other information are displayed in the area outside of the image display area RA.

The communication partner device e.g. a mobile phone transmits a moving image (moving image data) of the communication partner captured by the camera of the mobile phone, and voice (sound data) uttered by the communication partner. The call control module 32 starts to receive the moving image and the sound from the mobile phone (S103). The mobile phone of the communication partner has substantially the same configuration as the mobile phone 1 in an embodiment, and executes a moving image/sound transmitting process to be described later.

The call control module 32 monitors whether receiving a moving image has ceased (S104). As long as the user's line of sight is within the image display area RA, in the moving image data amount adjusting process to be described later, a transmission stop signal is not output, and the mobile phone of the communication partner continues transmission of a moving image. Therefore, receiving a moving image is continued. When receiving a moving image is continued (S104: NO), the call control module 32 displays the received moving image in the image display area RA (S105). Subsequently, the call control module 32 outputs the received sound from the external speaker 7 (S106).

When there is no user's operation of finishing a TV phone call, for instance, when there is no user's operation of finishing a call or switching the mobile phone from a TV phone call to an ordinary voice phone call (S107: NO), the processes from Step S104 to Step S107 are repeated.

When the user's line of sight is out of the image display area RA, in the moving image data amount adjusting process to be described later, a transmission stop signal is output to stop transmission of a moving image from the mobile phone of the communication partner.

When receiving a moving image has ceased (S104: YES), the call control module 32 continues to display an image of the last frame of the received moving image in the image display area RA (S108), and the received sound is output from the external speaker 7 (S109).

The call control module 32 monitors whether receiving a moving image is resumed (S110). When receiving a moving image is not resumed (S110: NO), the call control module 32 determines whether a user's operation of finishing a TV phone call has been performed (S111). When it is determined that the user's operation of finishing a TV phone call has not been performed (S111: NO), the processes from Step S108 to Step S111 are repeated.

When the user's line of sight returns to the image display area RA, in the moving image data amount adjusting process to be described later, a restraint release signal is output to resume transmission of a moving image by the mobile phone of the communication partner. When receiving a moving image is resumed (S110: YES), the call control module 32 displays the received moving image in the image display area RA (S105).

When the user's operation of finishing a TV phone call has been performed (S107: YES and S111: YES), the call control module 32 stops receiving a moving image and sound (S112), and closes the TV phone call screen 101 (S113). In this way, the moving image/sound receiving process is finished. When transmission of a moving image has already been stopped, in the process of Step S112, only receiving sound is stopped.

Figure 6:
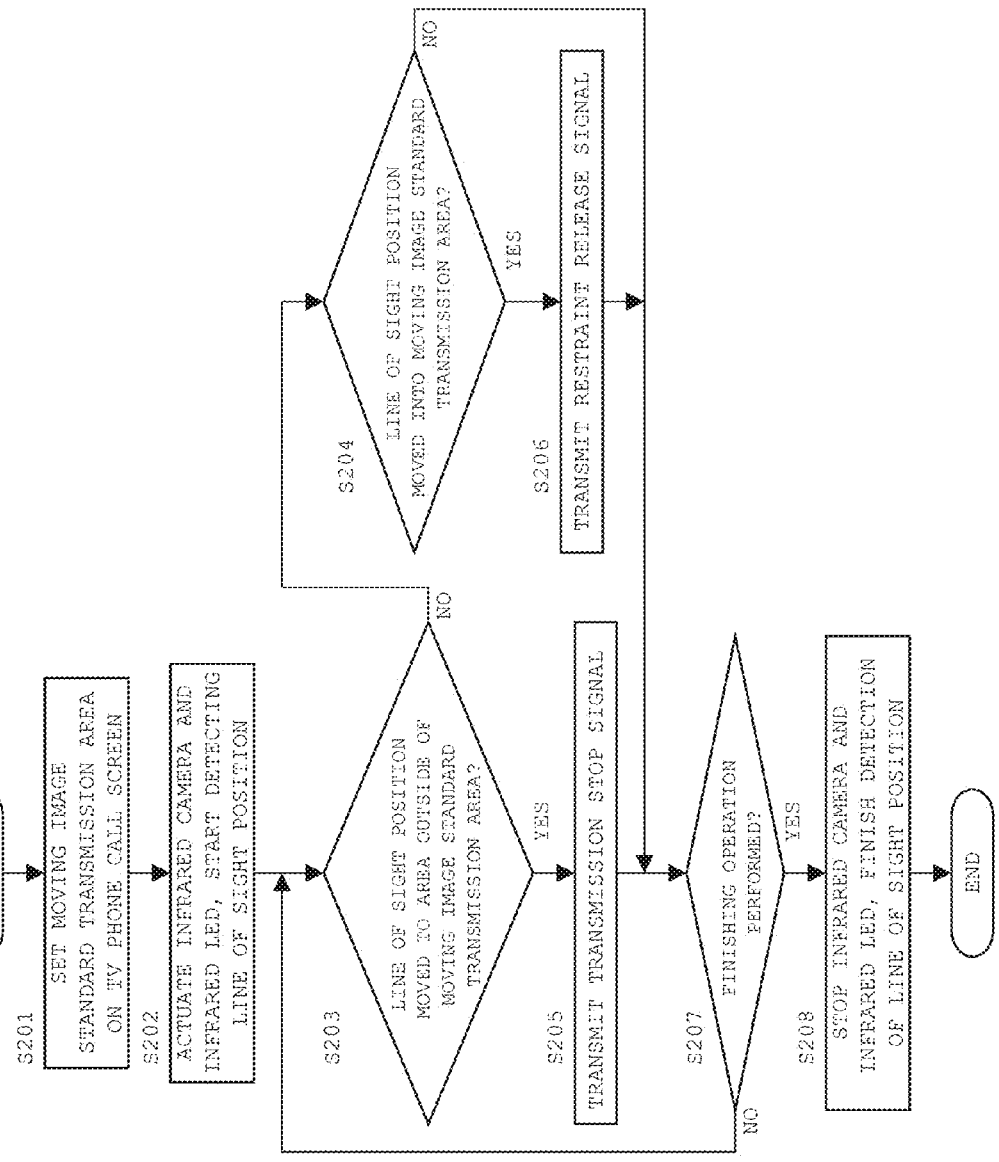
FIG. 6 is a flowchart of a moving image data amount adjusting process in an embodiment.

FIG. 6 is a flowchart of the moving image data amount adjusting process. Referring to FIG. 6, the moving image data amount adjusting process is described.

When the process is started, as illustrated in FIG. 5, the call control module 32 sets a moving image standard transmission area RB on the display surface 3, specifically, on the TV phone call screen 101 displayed on the display surface 3 by the call/sound receiving process (S201). The moving image standard transmission area RB is set for use in determining whether the user's line of sight position is out of the image display area RA, or returns to the image display area RA. The moving image standard transmission area RB includes the image display area RA, and is set to be slightly larger than the image display area RA.

For instance, divided areas assigned to the moving image standard transmission area RB, and the divided areas assigned to an area outside of the moving image standard transmission area RB are determined, and stored in the storage module 12. Detecting in which divided area, the user's line of sight position is located makes it possible to determine whether the line of sight position is within the moving image standard transmission area RB or is in the area outside of the moving image standard transmission area RB.

The call control module 32 actuates the infrared camera 9 and the infrared LED 10, and controls the line of sight detection module 31 to start detecting the user's line of sight position (S202). The call control module 32 determines whether the user's line of sight position has moved from the moving image standard transmission area RB into the area outside of the moving image standard transmission area RB, based on a detection result of the line of sight detection module 31 (S203). Subsequently, the call control module 32 determines whether the user's line of sight position has moved from the area outside of the moving image standard transmission area RB into the moving image standard transmission area RB (S204).

Even when the user's line of sight is directed at a certain point on the display surface 3, the user's line of sight position is not fixed, but may slightly swing. Therefore, when the user's line of sight is near the boundary of the moving image standard transmission area RB, the user's line of sight position is moved in and out of the moving image standard transmission area RB due to swinging of the line of sight. This may cause repetition of output of a transmission stop signal and a restraint release signal. In order to solve this problem, in an embodiment, the call control module 32 determines that the line of sight position has moved to the area outside of the moving image standard transmission area RB, when the line of sight position moves to the area outside of the moving image standard transmission area RB, and then stays in the area outside of the moving image standard transmission area RB for a predetermined time. Likewise, the call control module 32 determines that the line of sight position has moved into the moving image standard transmission area RB, when the line of sight position moves into the moving image standard transmission area RB, and then stays within the moving image standard transmission area RB for a predetermined time.

When the user's line of sight is out of the image display area RA, the line of sight position is moved to the area outside of the moving image standard transmission area RB, and then stays in the area outside of the moving image standard transmission area RB for a predetermined time. When it is determined that the line of sight position has moved to the area outside of the moving image standard transmission area RB (S203: YES), the call control module 32 transmits a transmission stop signal to the mobile phone of the communication partner via the communication module 19 (S205). When the mobile phone of the communication partner receives the transmission stop signal, transmission of a moving image is stopped.

Thereafter, when the user's line of sight returns to the image display area RA from the area outside of the moving image standard transmission area RB, the line of sight position moves into the moving image standard transmission area RB, and stays within the moving image standard transmission area RB for a predetermined time. When it is determined that the line of sight position has moved into the moving image standard transmission area RB (S204: YES), the call control module 32 transmits a restraint release signal to the mobile phone of the communication partner via the communication module 19 (S206). When the mobile phone of the communication partner receives the restraint release signal, transmission of a moving image is resumed.

When a user's operation of finishing a TV phone call has been performed (S207: YES), the call control module 32 stops the infrared camera 9 and the infrared LED 10, and controls the line of sight detection module 31 to finish detecting the user's line of sight position (S208). In this way, the moving image data amount adjusting process is finished.

Figure 7:
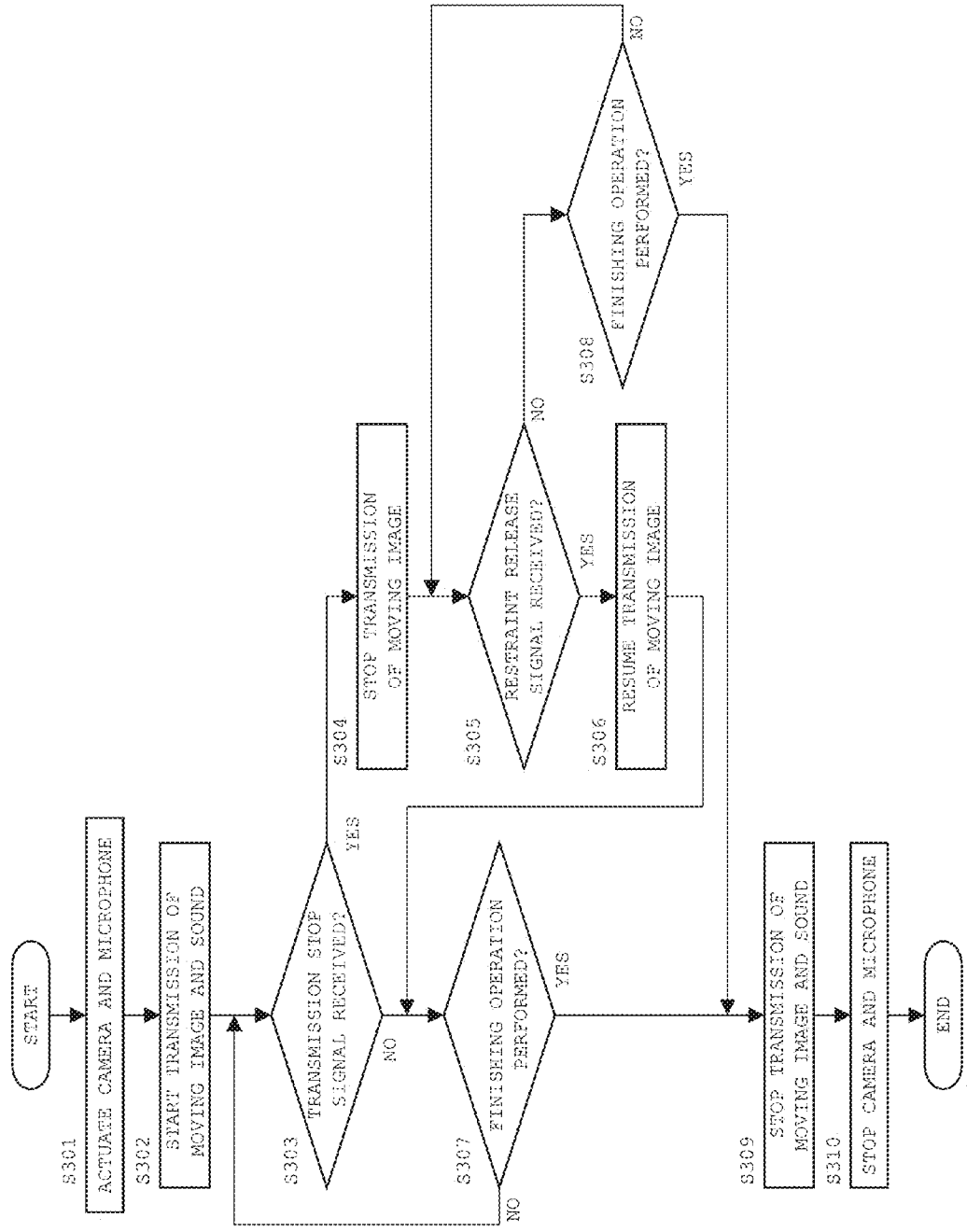
FIG. 7 is a flowchart of a moving image/sound transmitting process in an embodiment.

FIG. 7 is a flowchart of a moving image/sound transmitting process. Referring to FIG. 7, the moving image/sound transmitting process is described.

When the process is started, the call control module 32 actuates the camera 8 and the microphone 4 (S301). The call control module 32 starts transmission of a moving image (moving image data) of the user captured by the camera 8, and transmission of sound (sound data) input by the microphone 4 (S302).

The call control module 32 determines whether a transmission stop signal is received from the mobile phone of the communication partner (S303).

When the aforementioned moving image data amount adjusting process illustrated in FIG. 6 is executed by the mobile phone of the communication partner, and the line of sight of the communication partner is out of the image display area RA, a transmission stop signal is output from the mobile phone of the communication partner. When the transmission stop signal is received (S303: YES), the call control module 32 stops transmission of a moving image to the mobile phone of the communication partner (S304).

The call control module 32 determines whether a restraint release signal is received from the mobile phone of the communication partner (S305).

When the line of sight of the communication partner returns to the image display area RA of the mobile phone of the communication partner, a restraint release signal is output. When the restraint release signal is received (S305: YES), the call control module 32 resumes transmission of a moving image to the mobile phone of the communication partner (S306).

When a user's operation of finishing a TV phone call has been performed (S307: YES and S308: YES), the call control module 32 stops transmission of a moving image and sound (S309), and stops the camera 8 and the microphone 4 (S310). In this way, the moving image/sound transmitting process is finished. When transmission of a moving image has already been stopped, in the process of Step S309, only transmission of sound is stopped.

FIGS. 8A to 8C are diagrams of an example, when the user A and the user B make a TV phone call, using the mobile phones 1. FIG. 8A is a diagram of an operation to be performed between the mobile phone 1 of the user A and the mobile phone 1 of the user B. FIG. 8B is a diagram of a state that the line of sight of the user A is directed to the image display area RA. FIG. 8C is a diagram of a state that the line of sight of the user A is out of the image display area RA.

As illustrated in FIG. 8B, when the line of sight of the user A is directed to the image display area RA, a moving image and sound are transmitted from the mobile phone 1 of the user A to the mobile phone 1 of the user B, and a moving image and sound are transmitted from the mobile phone 1 of the user B to the mobile phone 1 of the user A. The moving image of the communication partner is displayed in the image display area RA of the mobile phone 1 of the user A.

Thereafter, as illustrated in FIG. 8C, when the line of sight of the user A is out of the image display area RA, it is determined that the line of sight is out of the image display area RA, and a transmission stop signal is transmitted from the mobile phone 1 of the user A to the mobile phone 1 of the user B. According to this control, transmission of a moving image is stopped in the mobile phone 1 of the user B, and only the sound is transmitted from the mobile phone 1 of the user B. An image of the last frame of the moving image that has been displayed at a time immediately before transmission is stopped is displayed in the image display area RA of the mobile phone 1 of the user A.

Thereafter, as illustrated in FIG. 8B, when the line of sight of the user A returns to the image display area RA, it is determined that the line of sight returns to the image display area RA, and a restraint release signal is transmitted from the mobile phone 1 of the user A to the mobile phone 1 of the user B. According to this control, transmission of a moving image is resumed in the mobile phone 1 of the user B, and a moving image and sound are transmitted again from the mobile phone 1 of the user B.

FIGS. 9A to 9C are diagrams of an example, when the user A makes a TV phone call simultaneously with the user B and with the user C. FIG. 9A is a diagram of a state that the line of sight of the user A is directed to an image display area RA1 associated with the user B. FIG. 9B is a diagram of a state that the line of sight of the user A is directed to an image display area RA2 associated with the user C. FIG. 9C is a diagram of a state that the line of sight of the user A is out of the image display area RA1 and out of the image display area RA2.

In the mobile phone 1 of the user A, a moving image/sound receiving process, a moving image/sound transmitting process, and a moving image data amount adjusting process associated with a TV phone call with the user B, and a moving/sound receiving process, a moving image/sound transmitting process, and a moving image data amount adjusting process associated with a TV phone call with the user C are concurrently executed.

The image display area RA1 associated with the user B, and the image display area RA2 associated with the user C are set in the TV phone call screen 101 displayed on the display surface 3. Further, a moving image standard transmission area RB1 associated with the user B, and a moving image standard transmission area RB2 associated with the user C are set in the TV phone call screen 101.

As illustrated in FIG. 9A, when the line of sight of the user A is directed to the image display area RA1, a transmission stop signal is output from the mobile phone 1 of the user A to the mobile phone 1 of the user C to stop transmission of a moving image from the mobile phone 1 of the user C. According to this control, although a moving image is displayed in the image display area RA1, an image of the last frame of the moving image that has been displayed at a time immediately before transmission is stopped is displayed in the image display area RA2.

As illustrated in FIG. 9B, when the line of sight of the user A is directed to the image display area RA2, a transmission stop signal is output from the mobile phone 1 of the user A to the mobile phone 1 of the user B to stop transmission of a moving image from the mobile phone 1 of the user B. According to this control, although a moving image is displayed in the image display area RA2, an image of the last frame of the moving image that has been displayed at a time immediately before transmission is stopped is displayed in the image display area RA1.

As illustrated in FIG. 9C, when the line of sight of the user A is out of the image display area RA1 and out of the image display area RA2, a transmission stop signal is output from the mobile phone 1 of the user A to the mobile phone 1 of the user B and to the mobile phone 1 of the user C to stop transmission of a moving image from the mobile phone 1 of the user B and from the mobile phone 1 of the user C. According to this control, an image of the last frame of the moving image that has been displayed at a time immediately before transmission is stopped is displayed in the image display area RA1 and in the image display area RA2.

In the moving image data amount adjusting process illustrated in FIG. 6, when it is determined that the user's line of sight position has moved from the moving image standard transmission area RB to the area outside of the moving image standard transmission area RB (S203: YES), in the process of Step S205, a rate lowering signal may be output, in place of a transmission stop signal. In this case, in the mobile phone 1 of the communication partner, in Step S304 of the moving image/sound transmitting process illustrated in FIG. 7, the call control module 32 transmits a moving image at a transfer rate lower than the transfer rate when the user's line of sight position is located within the moving image standard transmission area RB. In Step S108 of the moving image/sound receiving process illustrated in FIG. 4, the call control module 32 displays a moving image of a resolution lower than the resolution of the preceding image in the image display area RA.

As described above, according to an embodiment, when the user is not watching a moving image of the communication partner to be transmitted from the communication partner device (e.g. a mobile phone) any more, transmission of a moving image from the communication partner device is restrained. In other words, transmission of a moving image from the communication partner device is stopped. Alternatively, the transfer rate of a moving image from the communication partner device may be reduced. According to this configuration, it is possible to reduce the data amount of a moving image to be received by the mobile phone 1 via a network. This is advantageous in reducing the electric power consumption of the mobile phone 1, and in reducing the processing load. This is also advantageous in utilizing a network resource.

Further, according to an embodiment, the moving image standard transmission area RB is set to be larger than the image display area RA. There may be a time lag between output of a restraint release signal and re-receiving a moving image. However, transmission of a moving image is resumed at a point of time when the user's line of sight position returns to the moving image standard transmission area RB, which is larger than the image display area RA. This is advantageous in resuming display of a moving image as fast as possible at the time when the line of sight position returns to the image display area RA.

Furthermore, according to an embodiment, the line of sight position of the user is detected on the display surface 3. This is advantageous in precisely determining whether the user is watching a moving image displayed in the image display area RA.

First Modification

In the present modification, three determination areas are set around a moving image standard transmission area RB, as determination areas for use in determining the user's line of sight position, in addition to the moving image standard transmission area RB; and the data amount of a moving image to be transmitted from a communication partner device is adjusted depending on to which one of the determination areas, the line of sight position is shifted.

Figure 11:
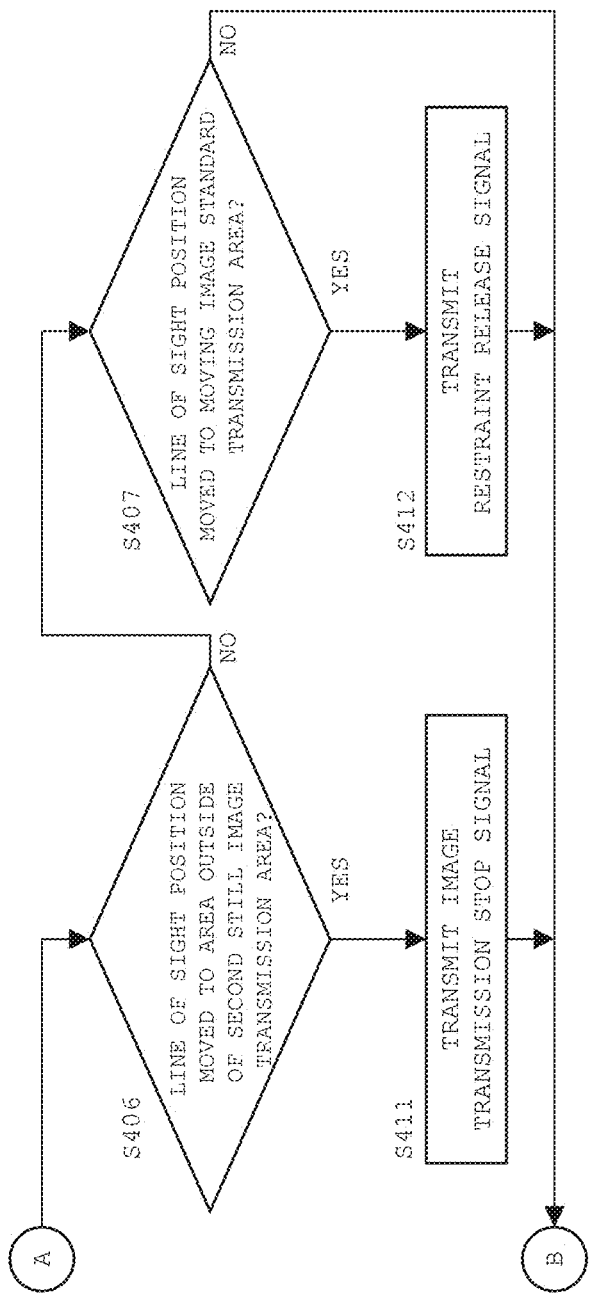
FIG. 11 is a flowchart of the moving image data amount adjusting process in the first modification.
Figure 12:
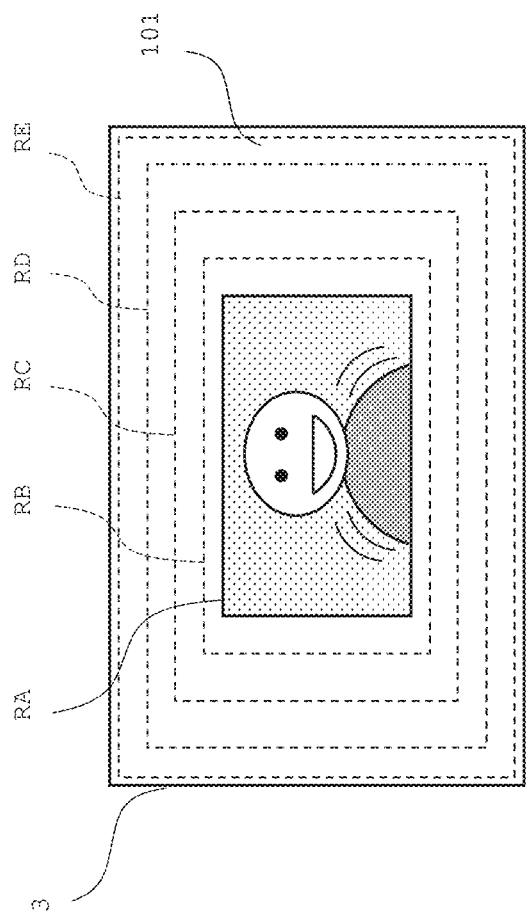
FIG. 12 is a diagram of a moving image transmission restraint area, a first still image transmission area, and a second still image transmission area set around a moving image standard transmission area in the first modification.

FIG. 10 and FIG. 11 are flowcharts of a moving image data amount adjusting process in the present modification. FIG. 12 is a diagram of a moving image transmission restraint area RC, a first still image transmission area RD, and a second still image transmission area RE to be set around the moving image standard transmission area RB. Referring to FIG. 10 to FIG. 12, the moving image data amount adjusting process in the present modification is described.

When the process is started, as illustrated in FIG. 12, a call control module 32 sets the determination areas RB to RE on a display surface 3, specifically, on a TV phone call screen 101 displayed on the display surface 3 by a call/sound receiving process (S401). Specifically, the call control module 32 sets the moving image standard transmission area RB, and sets the moving image transmission restraint area RC around the moving image standard transmission area RB. Further, the call control module 32 sets the first still image transmission area RD around the moving image transmission restraint area RC, and sets the second still image transmission area RE around the first still image transmission area RD. The outer perimeter of the second still image transmission area RE is set substantially equal to the outer perimeter of the display surface 3.

The call control module 32 actuates an infrared camera 9 and an infrared LED 10 so that a line of sight detection module 31 starts to detect the user's line of sight position (S402). The call control module 32 determines whether the user's line of sight position has moved from the area outside of the moving image transmission restraint area RC into the moving image transmission restraint area RC, based on a detection result of the line of sight detection module 31 (S403). Subsequently, the call control module 32 determines whether the user's line of sight position has moved from the area outside of the first still image transmission area RD into the first still image transmission area RD (S404). Subsequently, the call control module 32 determines whether the user's line of sight position has moved from the area outside of the second still image transmission area RE into the second still image transmission area RE (S405). Subsequently, the call control module 32 determines whether the user's line of sight has moved from the outside of the area outside of the second still image transmission area RE into the area outside of the second still image transmission area RE (S406). Subsequently, the call control module 32 determines whether the user's line of sight position has moved from the area outside of the moving image standard transmission area RB into the moving image standard transmission area RB (S407).

As well as an embodiment, the call control module 32 determines that the line of sight position moved to one of the determination areas RB to RE, when the line of sight position moves to the one of the determination areas RB to RE, and then stays within the one of the determination areas RB to RE for a predetermined time. Further, the call control module 32 determines that the line of sight position has moved to the area outside of the second still image transmission area RE, when the line of sight position moves to the area, and then stays within the area for a predetermined time.

When the user's line of sight position is out of an image display area RA, specifically, out of the moving image standard transmission area RB, and stays within the moving image transmission restraint area RC for a predetermined time, the call control module 32 determines that the line of sight position has moved into the moving image transmission restraint area RC (S403: YES). As a result of the determination, the call control module 32 transmits a rate lowering signal to the mobile phone of the communication partner via a communication module 19 (S408). When the rate lowering signal is received, the mobile phone of the communication partner lowers the transfer rate of a moving image, and transmits a moving image at a transfer rate (a low transfer rate) lower than the transfer rate when the line of sight position is located within the moving image standard transmission area RB.

When the user's line of sight position out of the image display area RA stays within the first still image transmission area RD for a predetermined time, the call control module 32 determines that the line of sight position has moved into the first still image transmission area RD (S404: YES). As a result of the determination, the call control module 32 transmits a first still image transmission signal to the mobile phone of the communication partner via the communication module 19 (S409). When the first still image transmission signal is received, the mobile phone of the communication partner stops transmission of a moving image, and transmits a still image of the communication partner captured by the camera at a relatively short updating time interval (e.g. at an interval of 10 seconds), in place of the moving image.

When the user's line of sight position out of the image display area RA stays within the second still image transmission area RE for a predetermined time, the call control module 32 determines that the line of sight position has moved into the second still image transmission area RE (S405: YES). As a result of the determination, the call control module 32 transmits a second still image transmission signal to the mobile phone of the communication partner via the communication module 19 (S410). When the second still image transmission signal is received, the mobile phone of the communication partner stops transmission of a moving image, and transmits a still image of the communication partner captured by the camera at a relatively long updating time interval (e.g. at an interval of 30 seconds), in place of the moving image.

When the user's line of sight position out of the image display area RA stays within the area outside of the second still image transmission area RE for a predetermined time, the call control module 32 determines that the line of sight position has moved into the area outside of the second still image transmission area RE (S406: YES). As a result of the determination, the call control module 32 transmits an image transmission stop signal to the mobile phone of the communication partner via the communication module 19 (S411). When the image transmission stop signal is received, the mobile phone of the communication partner stops transmission of a moving image, and a still image is not transmitted as well as a moving image.

Thereafter, when the user's line of sight returns to the image display area RA, moves into the moving image standard transmission area RB, and stays within the moving image standard transmission area RB for a predetermined time, the call control module 32 determines that the line of sight position has moved into the moving image standard transmission area RB (S407: YES). Subsequently, the call control module 32 transmits a restraint release signal to the mobile phone of the communication partner via the communication module 19 (S412). When the restraint release signal is received, the mobile phone of the communication partner resumes transmission of a moving image at a transfer rate (a high transfer rate) higher than the aforementioned low transfer rate.

When a user's operation of finishing a TV phone call has been performed (S413: YES), the call control module 32 stops the infrared camera 9 and the infrared LED 10, and controls the line of sight detection module 31 to finish detecting the user's line of sight position (S414). In this way, the moving image data amount adjusting process is finished.

Figure 13:
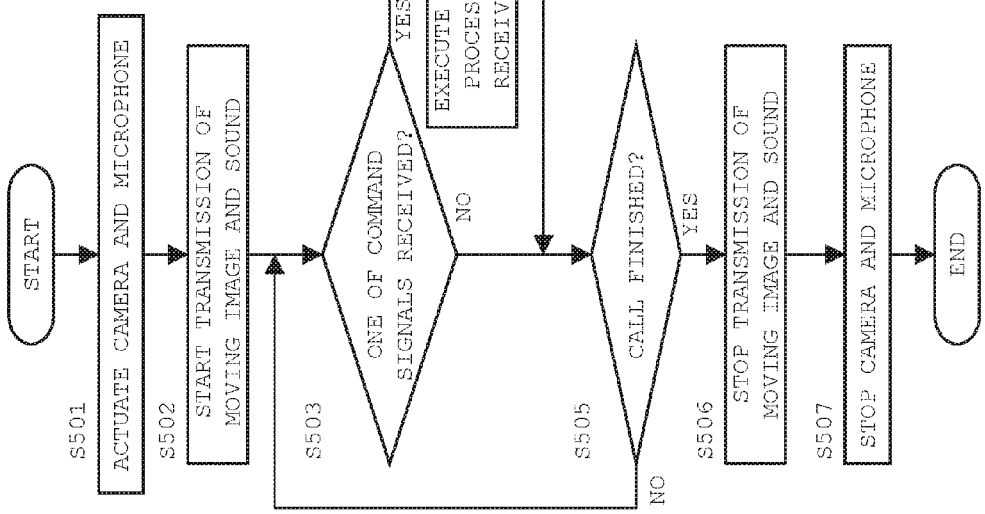
FIGS. 13A and 13B are diagrams for describing a moving image/sound transmitting process in the first modification.

FIGS. 13A and 13B are diagrams for describing a moving image/sound transmitting process in the present modification. FIG. 13A is a flowchart of the moving image/sound transmitting process. FIG. 13B is a diagram of an assignment table, in which image transmitting processes are assigned to respective command signals. The assignment table is stored in a storage module 12.

When the process is started, the call control module 32 actuates a camera 8 and a microphone 4 (S501). Subsequently, the call control module 32 starts transmission of a moving image (moving image data) of the user captured by the camera 8, and sound (sound data) input to the microphone 4 (S502).

The call control module 32 determines whether one of the command signals, i.e. a rate lowering signal, a first still image transmission signal, a second still image transmission signal, an image transmission stop signal, and a restraint release signal is received from the mobile phone of the communication partner (S503). When one of the command signals is received (S503: YES), the call control module 32 executes an image transmitting process associated with the received command signal in accordance with the assignment table illustrated in FIG. 13B (S504).

Specifically, when a rate lowering signal is received, the call control module 32 transmits a moving image at a low transfer rate. When a first still image transmission signal is received, the call control module 32 stops transmission of a moving image, and transmits a still image of the user captured by the camera 8 at a short updating time interval, in place of the moving image. When a second still image transmission signal is received, the call control module 32 stops transmission of a moving image, and transmits a still image of the user captured by the camera 8 at a long updating time interval, in place of the moving image. When an image transmission stop signal is received, the call control module 32 stops transmission of a moving image, and a still image is not transmitted as well as a moving image. When a restraint release signal is received, the call control module 32 transmits a moving image at a high transfer rate.

When a user's operation of finishing a TV phone call has been performed (S505: YES), the call control module 32 stops transmission of a moving image (a still image) and sound (S506), and stops the camera 8 and the microphone 4 (S507). In this way, the moving image/sound transmitting process is finished. When transmission of a moving image (a still image) has already been stopped, in the process of Step S506, only receiving sound is stopped.

The moving image/sound receiving process in the present modification is substantially the same as the moving image/sound receiving process in an embodiment as illustrated in FIG. 4. However, in the process of Step S108, when a still image is received, the call control module 32 displays the still image in the image display area RA, and when neither a moving image nor a still image is received, the call control module 32 displays an image of the last frame of the received moving image, or a latest updated still image in the image display area RA.

In this way, in the present modification, when the user's line of sight position is moved to the moving image transmission restraint area RC, a moving image of a low resolution is displayed in the image display area RA. When the user's line of sight position is moved to the first still image transmission area RD, which is an area outside of the moving image transmission restraint area RC, a still image updated at a short time interval is displayed in the image display area RA. When the user's line of sight position is moved to the second still image transmission area RE, which is an area outside of the first still image transmission area RD, a still image updated at a long time interval is displayed in the image display area RA. When the user's line of sight position is moved to the area outside of the second still image transmission area RE, an image of the last frame of the received moving image or a latest updated still image is displayed in the image display area RA.

As described above, in the present modification, the data amount of a moving image to be received is stepwise adjusted in such a manner that the movement of an image within the image display area RA becomes slow, as the distance of the user's line of sight position from the image display area RA increases. This makes it possible to prevent the user from feeling odd when the movement of an image within the image display area RA is unexpectedly changed.

Second Modification

In an embodiment, when the user's line of sight is out of the image display area RA (the moving image standard transmission area RB), it is determined that the user is not watching a moving image displayed in the image display area RA, and a transmission restraint signal (a transmission stop signal or a rate lowering signal) is output. Further, when the user's line of sight position returns to the image display area RA, it is determined that the user is watching a moving image displayed in the image display area RA, and a restraint release signal is output.

In the present modification, it is detected whether the user is present in the vicinity of a mobile phone 1. When it is detected that the user is not in the vicinity of the mobile phone 1, it is determined that the user is not watching a moving image displayed in an image display area RA, and a transmission restraint signal (a transmission stop signal or a rate lowering signal) is output. Further, when the user returns to the vicinity of the mobile phone 1, it is determined that the user is watching a moving image displayed in the image display area RA, and a restraint release signal is output.

Figure 14:
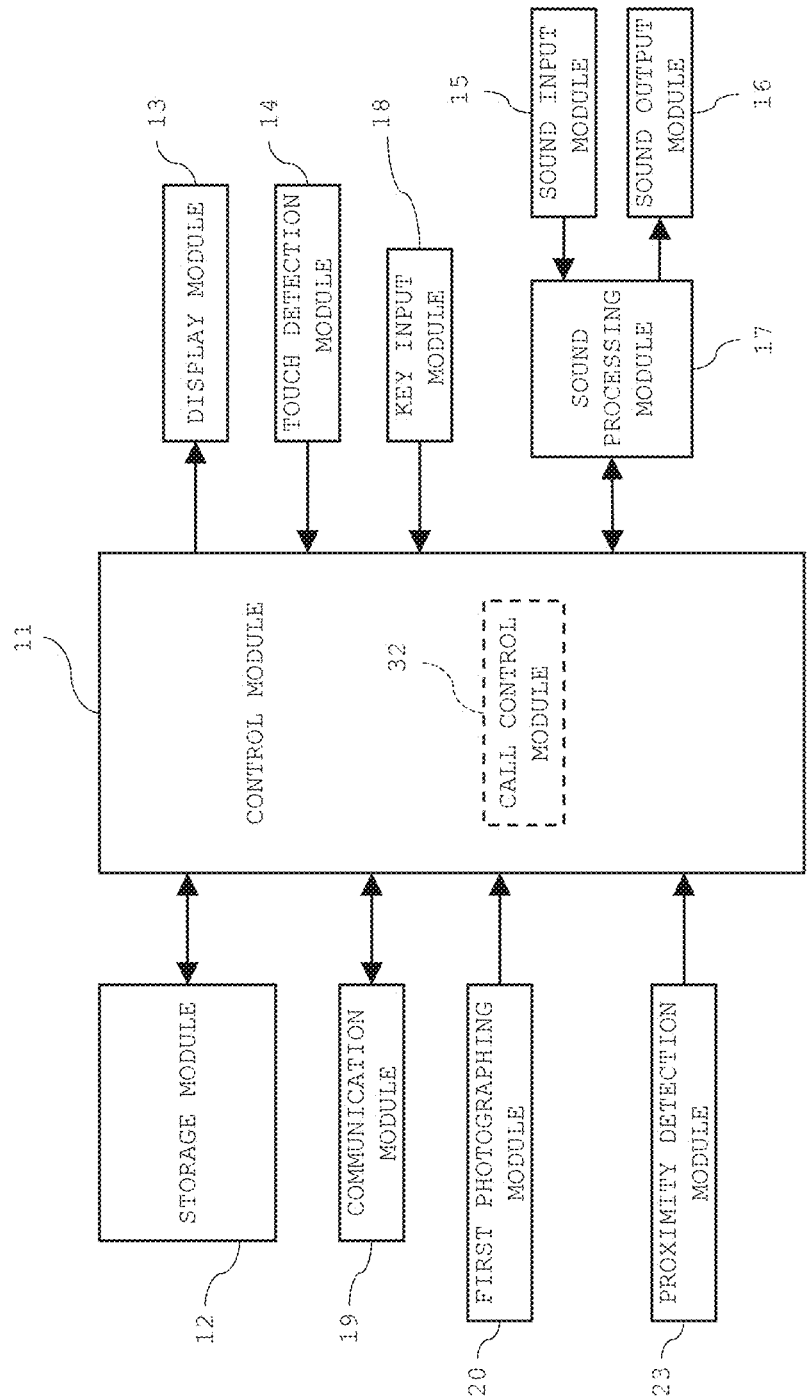
FIG. 14 is a block diagram of the overall configuration of a mobile phone in a second modification.

FIG. 14 is a block diagram of the overall configuration of the mobile phone 1 in the present modification. In the mobile phone 1 in the present modification, a proximity detection module 23 may be included, in place of a second photographing module 21, an infrared light output module 22, and a line of sight detection module 31. The other configuration is substantially the same as in an embodiment.

The proximity detection module 23 may include a proximity sensor. When the user, as a detection object, approaches the front surface of the mobile phone 1 by a predetermined distance, the proximity detection module 23 outputs a detection signal to a control module 11. The predetermined distance is set in advance, taking into consideration the user's distance from the mobile phone 1, when the user makes a TV phone call, specifically, when the user is watching an image displayed in the image display area RA. As far as a detection signal is output from the proximity detection module 23, it is possible to regard that the user is present in the vicinity of the mobile phone 1, and is watching a moving image.

Figure 15:
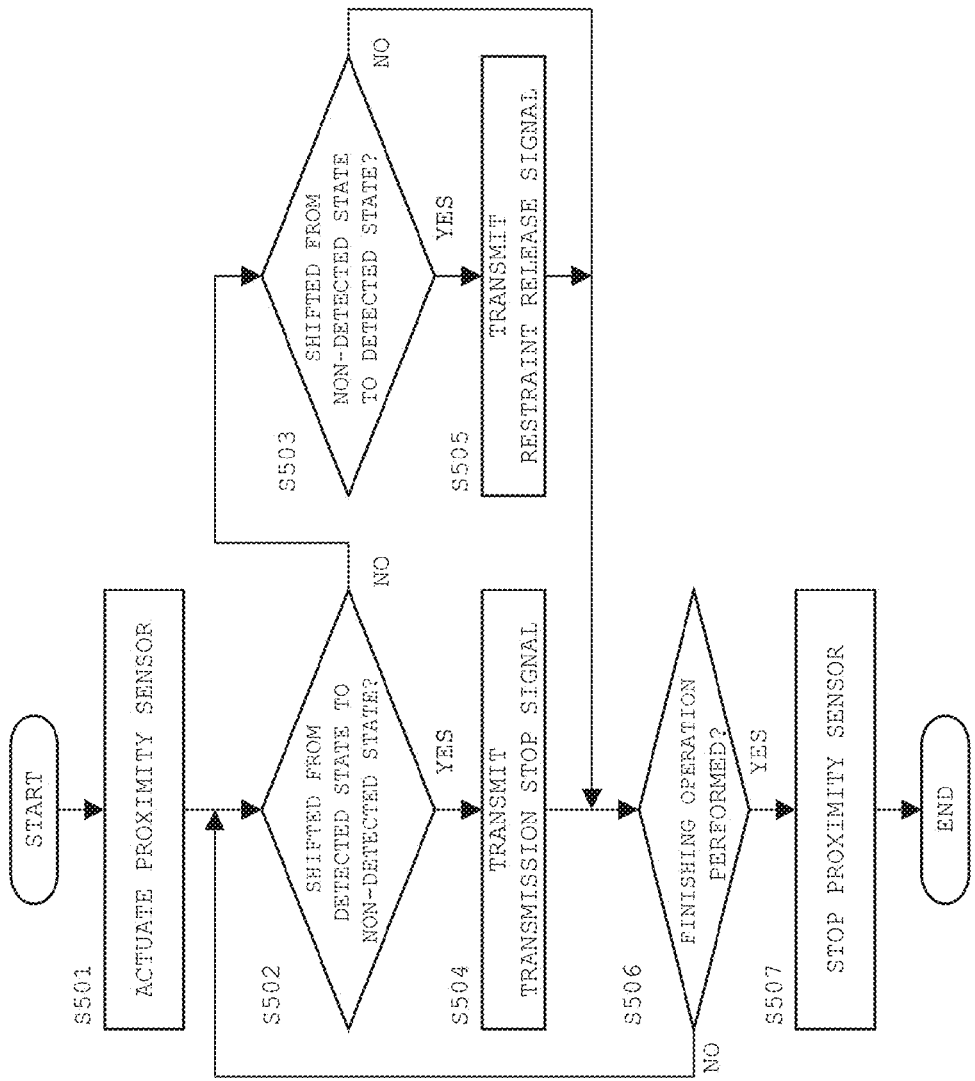
FIG. 15 is a flowchart of a moving image data amount adjusting process in the second modification.

FIG. 15 is a flowchart of a moving image data amount adjusting process in the present modification. The moving image data amount adjusting process is described referring to FIG. 15.

When the process is started, a call control module 32 actuates the proximity sensor of the proximity detection module 23 (S501). The call control module 32 determines whether detection by the proximity detection module 23 is changed from a state that the user is detected to a state that the user is not detected (S502). Subsequently, the call control module 32 determines whether detection by the proximity detection module 23 is changed from a state that the user is not detected to a state that the user is detected (S503).

When the user watching a moving image is away from the vicinity of the mobile phone 1, the proximity detection module 23 does not detect the user any more (S502: YES). Subsequently, the call control module 32 transmits a transmission stop signal to the mobile phone of the communication partner via a communication module 19 (S504). Alternatively, the call control module 32 may output a rate lowering signal, in place of a transmission stop signal.

Thereafter, when the user returns to the vicinity of the mobile phone 1, the proximity detection module 23 detects the user (S503: YES). Subsequently, the call control module 32 transmits a restraint release signal to the mobile phone of the communication partner via the communication module 19 (S505).

When a user's operation of finishing a TV phone call has been performed (S506: YES), the call control module 32 stops the proximity sensor (S507). In this way, the moving image data amount adjusting process is finished.

The moving image/sound receiving process and the moving image/sound transmitting process to be executed in the present modification are substantially the same as those in an embodiment.

As described above, according to the present modification, as well as an embodiment, it is possible to reduce the data amount of a moving image to be received by the mobile phone 1 via a network. This is advantageous in reducing the electric power consumption of the mobile phone 1, and in reducing the processing load. This is also advantageous in utilizing a network resource.

Third Modification

In the present modification, it is detected whether a face image of the user is included in an image captured by a first photographing module 20. When a user's face image disappears from a captured image, it is determined that the user is not watching a moving image displayed in an image display area RA, and a transmission restraint signal (a transmission stop signal or a rate lowering signal) is output. Further, when a user's face image appears in a captured image, it is determined that the user is watching a moving image displayed in the image display area RA, and a restraint release signal is output.

Figure 16:
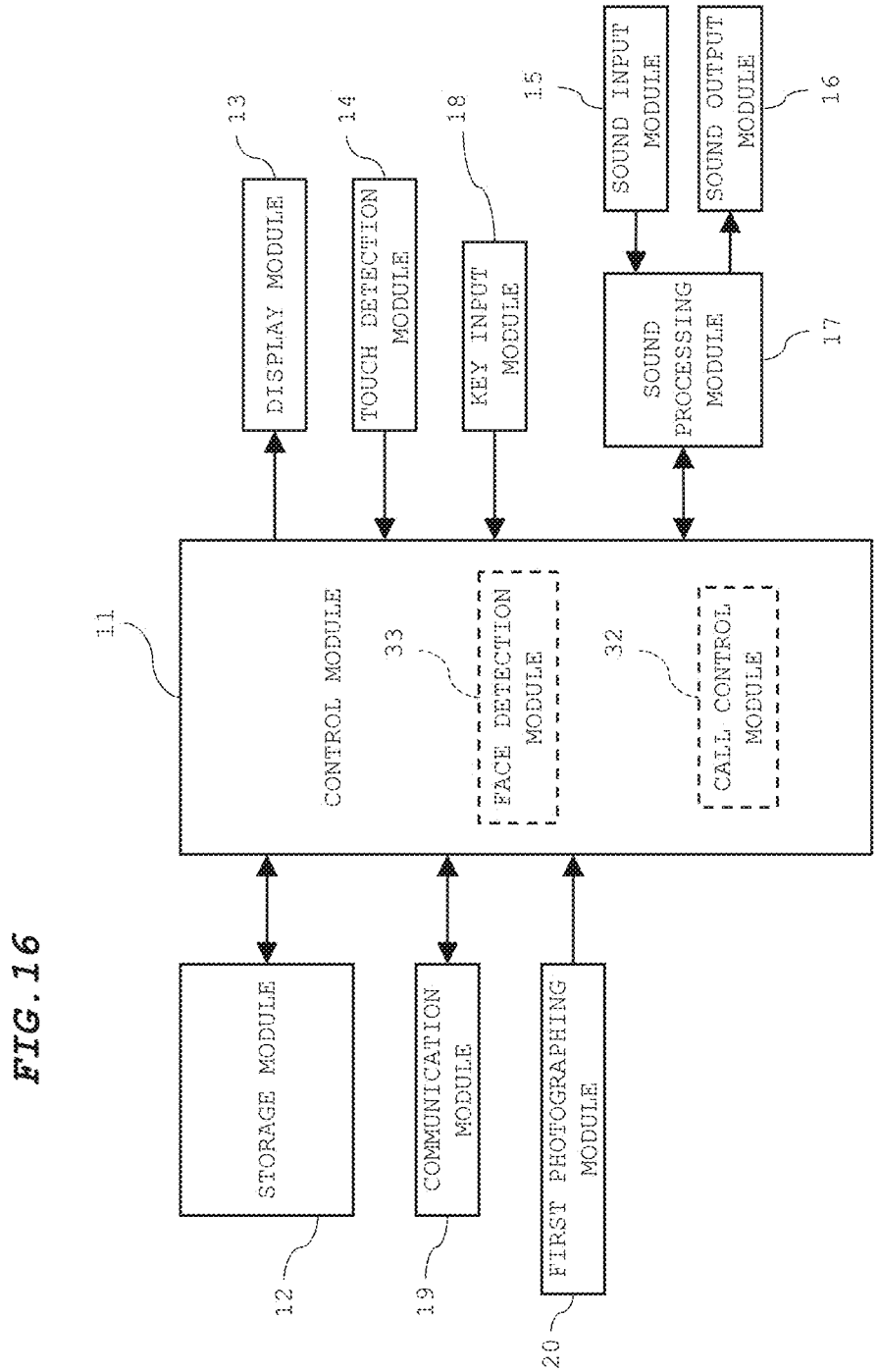
FIG. 16 is a block diagram of the overall configuration of a mobile phone in a third modification.

FIG. 16 is a block diagram of the overall configuration of a mobile phone 1 in the present modification. In the mobile phone 1 in the present modification, a face detection module 33 may be included, in place of a second photographing module 21, an infrared light output module 22, and a line of sight detection module 31. The other configuration is substantially the same as in an embodiment.

The face detection module 33 acquires a captured image from the first photographing module 20, and executes a well-known face recognition process for detecting whether a face image is included in the captured image. When a face image is detected by the face detection module 33, it is possible to regard that the user is watching a moving image.

Figure 17:
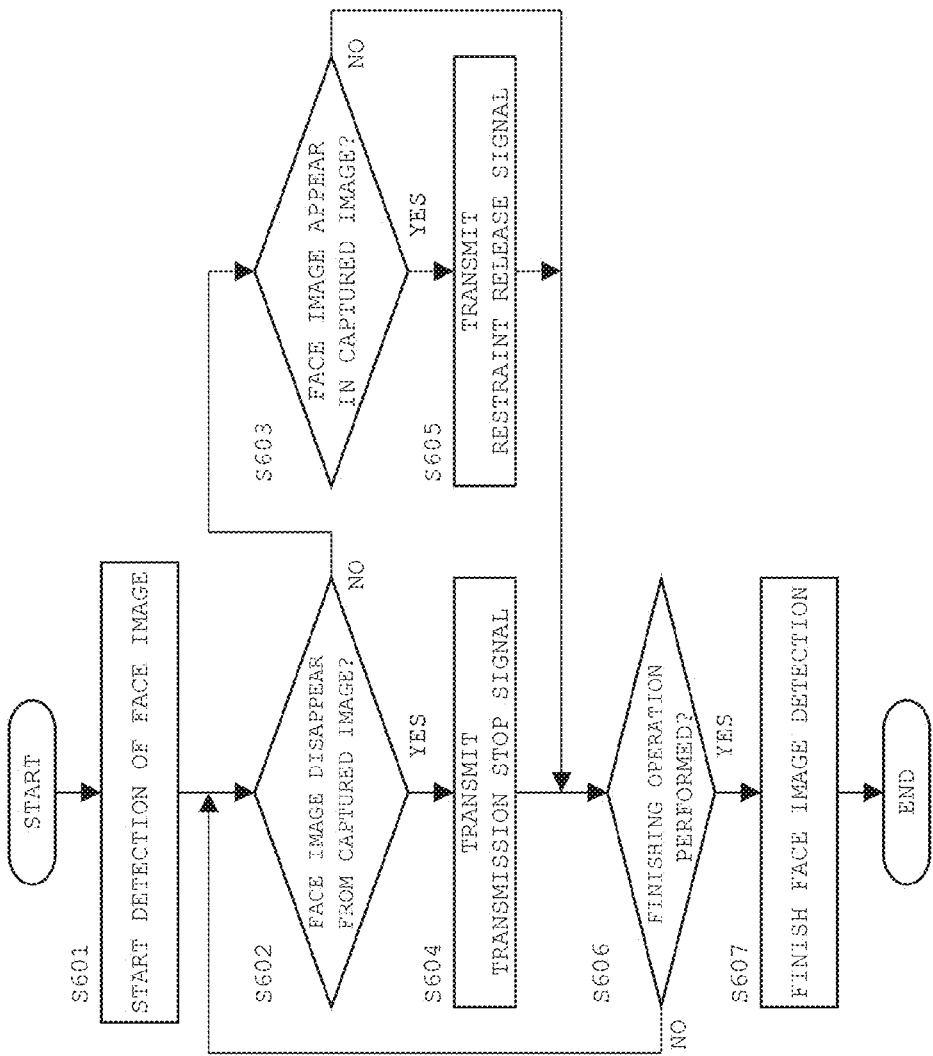
FIG. 17 is a flowchart of a moving image data amount adjusting process in the third modification.

FIG. 17 is a flowchart of a moving image data amount adjusting process in the present modification. The moving image data amount adjusting process is described referring to FIG. 17.

When the process is started, a call control module 32 controls the face detection module 33 to start detecting a face image (S601). The call control module 32 determines whether a face image disappears from a captured image, based on a detection result of the face detection module 33 (S602). Subsequently, the call control module 32 determines whether a face image appears in a captured image (S603).

When the user watching a moving image turns his/her face away from the mobile phone 1, or leaves away from the mobile phone 1, the face detection module 33 does not detect a face image any more. Subsequently, the call control module 32 determines that a face image disappears from a captured image (S602: YES), and transmits a transmission stop signal to the mobile phone of the communication partner via a communication module 19 (S604). Alternatively, the call control module 32 may output a rate lowering signal, in place of a transmission stop signal.

Thereafter, when the user's face returns to the mobile phone 1 and the user starts to watch a moving image again, the face detection module 33 detects a face image. Subsequently, the call control module 32 determines that a face image appears in a captured image (S603: YES), and transmits a restraint release signal to the mobile phone of the communication partner via the communication module 19 (S605).

When a user's operation of finishing a TV phone call has been performed (S606: YES), the call control module 32 controls the face detection module 33 to finish detecting a face image (S607). In this way, the moving image data amount adjusting process is finished.

The moving image/sound receiving process and the moving image/sound transmitting process to be executed in the present modification are substantially the same as those in an embodiment.

In the foregoing example, the presence or absence of a user's face image is determined. Alternatively, the presence or absence of an image of the user's body (including the face) may be determined, and a transmission restraint signal or a restraint release signal may be transmitted based on a result of the determination.

As described above, according to the present modification, as well as an embodiment, it is possible to reduce the data amount of a moving image to be received by the mobile phone 1 via a network. This is advantageous in reducing the electric power consumption of the mobile phone 1, and in reducing the processing load. This is also advantageous in utilizing a network resource.

Others

In the foregoing, an embodiment has been described. The present disclosure, however, is not limited by a foregoing embodiment. Further, an embodiment may be modified in various ways other than the above.

For instance, in an embodiment, the moving image standard transmission area RB is set to be larger than the image display area RA. Alternatively, the moving image standard transmission area RB may be set to be equal to the image display area RA, or may be set to be slightly smaller than the image display area RA.

Further, in an embodiment, a part of the TV phone call screen 101 is set in the image display area RA. Alternatively, the entirety of the TV phone call screen 101 may be set in the image display area RA.

Furthermore, in an embodiment, the call control module 32 may be configured such that when a transmission stop signal is received, and transmission of a moving image is stopped, the call control module 32 may transmit a still image at a predetermined updating time interval, in place of the moving image.

Furthermore, in the foregoing modifications, the first still image transmission area RD and the second still image transmission area RE are set around the moving image transmission restraint area RC. Alternatively, only one of the still image transmission areas may be set. Further alternatively, a still image transmission area may not be set. When a still image transmission area is not set, when the user's line of sight position is moved from the image display area RA to the area outside of the moving image transmission restraint area RC, an image transmission stop signal is transmitted, and a still image is not transmitted as well as a moving image. Further alternatively, two or more moving image transmission restraint areas may be set.

In addition, in an embodiment, in order to solve the problem that output of a transmission stop signal and a restraint release signal may be repeated due to swinging of the line of sight, it is determined that the line of sight position has moved into the moving image standard transmission area RB (or to the area outside of the moving image standard transmission area RB), when the line of sight position stays within the moving image standard transmission area RB (or stays in the area outside of the moving image standard transmission area RB). Alternatively, a configuration as illustrated in FIG. 18 may be adopted. Specifically, a first moving image standard transmission area RX is set on a TV phone call screen 101, and a second moving image standard transmission area RY is set around the first moving image standard transmission area RX. When the user's line of sight position is out of the second moving image standard transmission area RY, a call control module 32 outputs a transmission stop signal. Further, when even after the line of sight position returns to the second moving image standard transmission area RY from the area outside of the second moving image standard transmission area RY, the call control module 32 does not output a restraint release signal, and when the line of sight position enters the first moving image standard transmission area RX, the call control module 32 outputs a restraint release signal. The aforementioned configuration also makes it possible to solve the problem.

The present disclosure is not limited to a mobile phone provided with a TV phone function, and may be applicable to devices of various types provided with a TV phone function such as a PDA (Personal Digital Assistant) and a tablet PC provided with a TV phone function.

An embodiment of the present disclosure is applicable to various modifications other than the above, as necessary, as far as such modifications do not depart from the technical scope of the present disclosure as defined in the claims.

What is claimed is:

1. A device with a TV phone function, comprising:
    a communication module configured to transmit and receive data;
    a photographing module configured to capture an image of a subject;
    a sound input module configured to receive input of sound;
    a sound output module configured to output sound;
    a display module including a display surface; and
    a call control module configured to:
        transmit a moving image captured by the photographing module and sound input by the sound input module to a communication partner device via the communication module,
        when the communication module receives a moving image from the communication partner device by the communication module, display the received moving image in a display area set on the display surface,
        when the communication module receives sound from the communication partner device by the communication module, output the received sound from the sound output module, and
    output a transmission restraint signal for restraining transmission of a moving image to the communication partner device, when a first determination condition for use in judging that a user is not watching a moving image displayed in the display area is satisfied, wherein
    the call control module outputs a restraint release signal for releasing restrained transmission of a moving image to the communication partner device, when a second determination condition for use in judging that the user is watching a moving image displayed in the display area is satisfied in a state that transmission of a moving image from the communication partner device is restrained by the transmission restraint signal.

2. The device with a TV phone function according to claim 1, further comprising:
    a line of sight detection module configured to detect a line of sight position of the user on the display surface, wherein
    the call control module is configured to:
    output the transmission restraint signal based on a detection that the line of sight position is out of the display area, and
    output the restraint release signal based on a detection that the line of sight position returns to the display area.

3. The device with a TV phone function according to claim 2, wherein
    the call control module is configured to:
    set a first determination area including the display area on the display surface;
    output the transmission restraint signal, based on a determination that the line of sight position is moved from the first determination area to an area outside of the first determination area; and
    output the restraint release signal, based on a determination that the line of sight position is moved from the area outside of the first determination area into the first determination area.

4. The device with a TV phone function according to claim 3, wherein
    the first determination area is larger than the display area.

5. The device with a TV phone function according to claim 3, wherein
    the transmission restraint signal includes a transmission stop signal for stopping transmission of a moving image to the communication partner device, or a rate lowering signal for lowering a transfer rate of a moving image to the communication partner device.

6. The device with a TV phone function according to claim 5, wherein
    the call control module is configured to:
    set a second determination area around the first determination area;
    output the rate lowering signal, based on a determination that the line of sight position is moved from an area outside of the second determination area into the second determination area; and
    output the transmission stop signal, based on a determination that the line of sight position is moved from an inner position than the area outside of the second determination area into the area outside of the second determination area.

7. The device with a TV phone function according to claim 5, wherein the transmission stop signal includes
- a first stop signal for stopping transmission of a moving image to the communication partner device, and for transmitting a still image captured by the photographing module at a predetermined updating time interval, in place of the moving image, and
- a second stop signal for stopping transmission of a moving image to the communication partner device, and for prohibiting transmission of a still image captured by the photographing module.

8. The device with a TV phone function according to claim 7, wherein
the call control module is configured to:
- set a second determination area around the first determination area, and set a third determination area around the second determination area;
- output the rate lowering signal, based on a determination that the line of sight position is moved from an area outside of the second determination area into the second determination area;
- output the first stop signal, based on a determination that the line of sight position is moved from an area outside of the third determination area into the third determination area; and
- output the second stop signal, based on a determination that the line of sight position is moved from an inner position than the area outside of the third determination area into the area outside of the third determination area.

9. A device with a TV phone function, comprising:
- a communication module configured to transmit and receive data;
- a photographing module configured to capture an image of a subject;
- a sound input module configured to receive input of sound;
- a sound output module configured to output sound;
- a display module including a display surface;
- a call control module configured to:
  - transmit a moving image captured by the photographing module and sound input by the sound input module to a communication partner device via the communication module,
  - when the communication module receives a moving image from the communication partner device by the communication module, display the received moving image in a display area set on the display surface,
  - when the communication module receives sound from the communication partner device by the communication module, output the received sound from the sound output module, and
  - output a transmission restraint signal for restraining transmission of a moving image to the communication partner device, when a first determination condition for use in judging that a user is not watching a moving image displayed in the display area is satisfied;
- a proximity detection module configured to detect proximity of a detection object to the device with a TV phone function, wherein
the call control module outputs the transmission restraint signal, based on non-detection of proximity of the detection object by the proximity detection module after detection of the proximity of the detection object.

10. A device with a TV phone function, comprising:
- a communication module configured to transmit and receive data;
- a photographing module configured to capture an image of a subject;
- a sound input module configured to receive input of sound;
- a sound output module configured to output sound;
- a display module including a display surface;
- a call control module configured to:
  - transmit a moving image captured by the photographing module and sound input by the sound input module to a communication partner device via the communication module,
  - when the communication module receives a moving image from the communication partner device by the communication module, display the received moving image in a display area set on the display surface,
  - when the communication module receives sound from the communication partner device by the communication module, output the received sound from the sound output module, and
  - output a transmission restraint signal for restraining transmission of a moving image to the communication partner device, when a first determination condition for use in judging that a user is not watching a moving image displayed in the display area is satisfied;
- an image detection module configured to detect an image of the user from an image captured by the photographing module, wherein
the call control module outputs the transmission restraint signal, based on non-detection of the user's image by the image detection module after detection of the user's image.

* * * * *